US008477597B2

(12) United States Patent
Zhang et al.

(10) Patent No.: US 8,477,597 B2
(45) Date of Patent: Jul. 2, 2013

(54) METHOD AND SYSTEM FOR RESILIENT ROUTING RECONFIGURATION

(76) Inventors: Yin Zhang, Austin, TX (US); Lili Qiu, Austin, TX (US)

( * ) Notice: Subject to any disclaimer, the term of this patent is extended or adjusted under 35 U.S.C. 154(b) by 261 days.

(21) Appl. No.: 12/787,411

(22) Filed: May 26, 2010

(65) Prior Publication Data

US 2010/0302935 A1    Dec. 2, 2010

Related U.S. Application Data

(60) Provisional application No. 61/181,604, filed on May 27, 2009.

(51) Int. Cl.
*G01R 31/08* (2006.01)

(52) U.S. Cl.
USPC .......................................... 370/217; 370/230

(58) Field of Classification Search
USPC ........................................................ 370/218
See application file for complete search history.

(56) References Cited

U.S. PATENT DOCUMENTS

| 7,388,842 | B1 | 6/2008 | Applegate et al. | |
|---|---|---|---|---|
| 2002/0133756 | A1* | 9/2002 | Jain | 714/43 |
| 2002/0163682 | A1* | 11/2002 | Su et al. | 359/110 |
| 2004/0196787 | A1* | 10/2004 | Wang et al. | 370/229 |
| 2005/0220026 | A1 | 10/2005 | Dziong et al. | |
| 2006/0215666 | A1 | 9/2006 | Shepherd et al. | |
| 2010/0124930 | A1* | 5/2010 | Andrews et al. | 455/436 |

OTHER PUBLICATIONS

D. Applegate, L. Breslau, and E. Cohen. Coping with network failures: Routing strategies for optimal demand oblivious restoration. In Proceedings of ACM SIGMETRICS, Jun. 2004.
D. Applegate and E. Cohen. Making intra-domain routing robust to changing and uncertain traffic demands: Understanding fundamental tradeoffs. In Proceedings of ACM SIGCOMM, Aug. 2003.
A. Atlas and Z. Zinin. Basic specification for IP Fast-Reroute: loop-free alternates. IETF Internet-Draft, draft-ietf-rtgwg-ipfrr-spec-base-10.txt, 2007.
A. Elwalid, C. Jin, S. Low, and I. Widjaja. MATE: MPLS adaptive traffic engineering. In Proceedings of IEEE INFOCOM, Apr. 2001.
A. Farrel, J. P. Vasseur, and J. Ash. A Path Computation Element (PCE)-based Architecture, RFC 4655, Aug. 2006.
C. Zhang, Z. Ge, J. Kurose, Y. Liu, and D. Towsley. Optimal routing with multiple traffic matrices: Tradeoff between average case and worst case performance. In Proceedings of ICNP, Nov. 2005.
B. Fortz, J. Rexford, and M. Thorup. Traffic engineering with traditional IP routing protocols. IEEE Communication Magazine, Oct. 2002.
B. Fortz and M. Thorup. Internet traffic engineering by optimizing OSPF weights. In Proceedings of IEEE INFOCOM, Mar. 2000.

(Continued)

*Primary Examiner* — Sai-Ming Chan
(74) *Attorney, Agent, or Firm* — Winstead PC

(57) ABSTRACT

A method and system for resilient routing reconfiguration, which provides provably congestion-free rerouting under a large number of failure scenarios and achieves efficiency and flexibility in accommodating different performance requirements, is disclosed. The method of embodiments comprises an offline precomputation phase and an online reconfiguration phase. Embodiments of the present invention also provide a number of useful functionalities, including (i) coping with traffic variations, (ii) supporting realistic failure scenarios, (iii) accommodating prioritized traffic with different protection levels, and (iv) balancing the trade-off between performance and resilience.

42 Claims, 11 Drawing Sheets

OTHER PUBLICATIONS

B. Fortz and M. Thorup. Robust optimization of OSPF/IS-IS weights. In Proceedings of INOC, Oct. 2003.

P. Francois, C. Fillsfills, J. Evans, and O. Bonaventure. Achieving sub-second IGP convergence in large IP networks. ACM Computer Communication Review, 35(3):35-44, 2005.

G. Iannaccone, C. Chuah, S. Bhattacharyya, and C. Diot. Feasibility of IP restoration in a tier-1 backbone. IEEE Network Magazine, 18(2):13-19, 2004.

S. Iyer, S. Bhattacharyya, N. Taft, and C. Diot. An approach to alleviate link overload as observed on an IP backbone. In Proceedings of IEEE INFOCOM, Apr. 2003.

S. Kandula, D. Katabi, B. Davie, and A. Charny. Walking the tightrope: Responsive yet stable traffic engineering. In Proceedings of ACM SIGCOMM, Aug. 2005.

K. Kar, M. S. Kodialam, and T. V. Lakshman. Routing restorable bandwidth guaranteed connections using maximum 2-route flows. IEEE/ACM Transactions on Networking, 11(5):772-781, 2003.

M. Kodialam and T. V. Lakshman. Dynamic routing of locally restorable bandwidth guaranteed tunnels using aggregated link usage information. In Proceedings of IEEE INFOCOM, Apr. 2001.

M. Kodialam, T. V. Lakshman, and S. Sengupta. Efficient and robust routing of highly variable traffic. In Proceedings of HotNets-III, Nov. 2004.

M. Kodialam, T. V. Lakshman, and S. Sengupta. A simple traffic independent scheme for enabling restoration oblivious routing of resilient connections. In Proceedings of IEEE INFOCOM, Apr. 2004.

M. Kodialam, T. V. Lakshman. Dynamic routing of restorable bandwidth-guaranteed tunnels using aggregated network resource usage information. IEEE/ACM Transactions on Networking, 11(3):399-410, 2003.

K. Lakshminarayanan, M. Caesar, M. Rangan, T. Anderson, S. Shenker, and I. Stoica. Achieving convergence-free routing using failure-carrying packets. In Proceedings of ACM SIGCOMM, Aug. 2007.

M. Motiwala, M. Elmore, N. Feamster, and S. Vempala. Path splicing. In Proceedings of ACM SIGCOMM, 2008.

M. Roughan, M. Thorup, and Y. Zhang. Traffic engineering with estimated traffic matrices. In Proceedings of IMC, Oct. 2003.

M. Shand and S. Bryant. IP fast reroute framework. IETF Internet-Draft, draft-ietf-rtgwg-ipfrr-framework-06.txt, 2007.

V. Sharma, B. M. Crane, S. Makam, K. Owens, C. Huang, F. Hellstrand, J. Weil, L. Andersson, B. Jamoussi, B. Cain, S. Civanlar, and A. Chiu. Framework for MPLS-Based Recovery. RFC 3469, Feb. 2003.

H. Wang, H. Xie, L. Qiu, Y. R. Yang, Y. Zhang, and A. Greenberg. COPE: Traffic engineering in dynamic networks. In Proceedings of ACM SIGCOMM, Aug. 2006.

International Preliminary Report on Patentability for International Application No. PCT/US2010/036141 dated Nov. 29, 2011.

* cited by examiner

METHOD AND SYSTEM FOR RESILIENT ROUTING RECONFIGURATION

RELATED APPLICATIONS

The present application claims the priority benefits of Zhang et al., U.S. Provisional Patent Application No. 61/181,604 titled, "RESILIENT ROUTING RECONFIGURATION (R3)", filed on May 27, 2009, which is hereby incorporated by reference in its entirety.

FIELD OF THE INVENTION

This invention relates generally to Internet Protocol (IP) network operations. More particularly, the invention relates to a method and system for resilient routing reconfiguration (R3), a protection scheme for routing in an IP network that can avoid congestion and offer predictable performance under one or a series of link failures.

BACKGROUND OF THE INVENTION

Network resiliency, defined as the ability of an IP network to recover quickly and smoothly from one or a series of failures or disruptions, is becoming increasingly important in the operation of modern IP networks. Recent large-scale deployment of delay- and loss-sensitive services such as VPN and IPTV impose stringent requirements on the tolerable duration and level of disruptions on IP traffic. In a recent survey of major network carriers including AT&T, BT, and NTT, Telemark concludes that "The 3 elements which carriers are most concerned about when deploying communication services are network reliability, network usability and network fault processing capabilities" (See Telemark, "Telemark survey," http://www.telemarkservices.com/, 2006). All three relate to network resiliency.

Unfortunately, the current techniques for fault processing to achieve resiliency are still far from ideal. Consider fast-rerouting (FRR) (See M. Shand and S. Bryant, "IP fast reroute framework," *IETF Internet-Draft*, draft-ietf-rtgwg-ipfrr-framework-06.txt, 2007), the major currently deployed technique to handle network failures. As a major tier-1 ISP pointed out at Multi-Protocol Label Switching (MPLS) World Congress 2007, there are major practical challenges when using FRR in its business core network (See N. So and H. Huang, "Building a highly adaptive, resilient, and scalable MPLS backbone," http://www.wandl.com/html/support/papersNerizonBusiness WANDL MPLS2007.pdf, 2007):

(a) Complexity: "the existing FRR bandwidth and preemption design quickly becomes too complicated when multiple FRR paths are set up to account for multiple failures;"

(b) Congestion: "multiple network element failure can cause domino effect on FRR reroute due to preemption which magnifies the problem and causes network instability;"

(c) No performance predictability: "service provider loses performance predictability due to the massive amount of combinations and permutations of the reroute scenarios."

The importance of network resiliency has attracted major attention in the research community. Many mechanisms have been proposed to quickly detour around failed network devices (See, P. Francois, C. Filsfils, J. Evans, and O. Bonaventure, "Achieving sub-second IGP convergence in large IP networks," *ACM Computer Communication Review*, 35(3):35-44, 2005 (Francois et al. 2005), G. Iannaccone, C. Chuah, S. Bhattacharyya, and C. Diot, "Feasibility of IP restoration in a tier-1 backbone," *IEEE Network Magazine*, 18(2):13-19, 2004 (Iannaccone et al. 2004), M. Motiwala, M. Elmore, N. Feamster, and S. Vempala, "Path splicing," *Proc. ACM SIGCOMM*, 2008 (Motiwala et al. 2008), J. P. Vasseur, M. Pickavet, and P. Demeester, "Network Recovery: Protection and Restoration of Optical, SONET-SDH, and MPLS," Morgan Kaufmann, 2004 (Vasseur et al. 2004)). The focus of these studies, however, was mainly on reachability only (i.e., minimizing the duration in which routes are not available to a set of destinations). Hence, they do not address the aforementioned practical challenges, in particular on congestion and performance predictability.

It is crucial to consider congestion and performance predictability when recovering from failures. Since the overall network capacity is reduced after failures, if the remaining network resources are not efficiently utilized, serious congestion may occur. As observed in a measurement study on a major IP backbone (See S. Iyer, S. Bhattacharyya, N. Taft, and C. Diot, "An approach to alleviate link overload as observed on an IP backbone," *Proc. IEEE INFOCOM*, April 2003 (Iyer et al. 2003)), network congestion is mostly caused by traffic that has been rerouted due to link failures. Meanwhile, it has been shown that focusing only on reachability may lead to long periods of serious congestion and thus violation of service level agreements (SLAs).

However, it may be challenging to derive a routing protection scheme to offer performance predictability and avoid congestion. The main difficulty may lie in the vast number of failure scenarios, which grows exponentially with the number of links to be considered. Consider a tier-1 ISP network with 500 links, and assume that the network would like to find a routing protection plan to protect 3 simultaneous link failures. The number of such scenarios exceeds 20 million! Despite much progress on intra-domain traffic engineering, optimizing the routing simultaneously for just a few hundred network topologies is already beyond the means of any existing technique. As a result, existing routing protection schemes have to either focus exclusively on reachability (hoping that congestion does not occur), or consider only a single link failure (which is insufficient as SLAs become ever more demanding).

Therefore, there is a need for a method and system for deriving a routing protection scheme to provide predictable performance and avoid congestion under one or a series of failures in an IP network.

BRIEF SUMMARY OF THE INVENTION

The problems and challenges outlined above may at least in part be addressed by a system and method for Resilient Routing Reconfiguration (R3) as described herein.

The following presents a simplified summary of the disclosure in order to provide a basic understanding to the reader. This summary is not an exhaustive or limiting overview of the disclosure. The summary is not provided to identify key and, or critical elements of the invention, delineate the scope of the invention, or limit the scope of the invention in any way. Its sole purpose is to present some of the concepts disclosed in a simplified form, as an introduction to the more detailed description that is presented later.

Embodiments of the present invention provide a general method for covering all possible failure scenarios with a compact set of linear constraints on the amounts of traffic that should be rerouted. Specifically, when F links fail, the traffic originally routed through each failed link has to be rerouted by the remaining network. While the amount of rerouted traffic for a failed link depends on the specific failure scenario, it is always upper bounded by the capacity of the failed link (so long as the routing before the failure is congestion-free). Therefore, by creating a virtual demand for every link in the network (whose volume is equal to its link capacity) and taking the convex combination of all such virtual demands, the method of embodiments can cover the entire space of rerouted traffic under all possible combinations of F link failures. Since the convex hull of virtual demands can be represented as a compact set of linear constraints, linear programming duality can be used to efficiently optimize routing over the entire set. In this way, the method of embodiments eliminates the needs for enumerating failure scenarios by converting topology uncertainty (due to failures) into uncertainty in rerouted traffic, which may be easier to cope with.

Embodiments of the present invention further provide a routing protection method and system that comprises an offline precomputation phase and an online reconfiguration phase. The offline phase precomputes routing for the actual demand plus the virtual demand on the original network topology; while the online reconfiguration phase responds to failures using a simple rescaling procedure, which converts the offline precomputed routing into a protection routing that does not traverse any failed links. A unique feature of the method of embodiments is that it is (i) provably congestion-free under multiple link failures, and (ii) provably optimal for single-link failure scenarios.

Embodiments of the present invention also provide several methods that extend R3 to cope with (i) traffic variations, (ii) realistic failure scenarios, (iii) prioritized traffic with different protection levels, and (iv) the tradeoff between performance and resilience.

R3 protection may be implemented using MPLS-fr (a simple extension of MPLS), while the base routing may use either OSPF or MPLS. Evaluation using Emulab and simulation based on real Internet topologies and traffic traces show that R3 can achieve near-optimal performance and is at least 50% better than existing schemes such as OSPF recovergence, OSPF with CSPF fast rerouting, FCP, and Path Splicing.

BRIEF DESCRIPTION OF THE DRAWINGS

In the following description, for purposes of explanation, numerous specific details are set forth in order to provide a thorough understanding of an embodiment of the present disclosure. It will be evident, however, to one skilled in the art that the present disclosure may be practiced without these specific details. The present disclosure is illustrated by way of example and not limitation in the figures of the accompanying drawings, in which like references indicate similar elements and in which:

FIG. 1A shows that under normal condition, router R1 routes flows to R3 through R2; FIG. 1B shows that after link (R1,R2) fails, R4 and R5 carry protection traffic by label stacking.

DETAILED DESCRIPTION OF THE INVENTION

Figure 1:
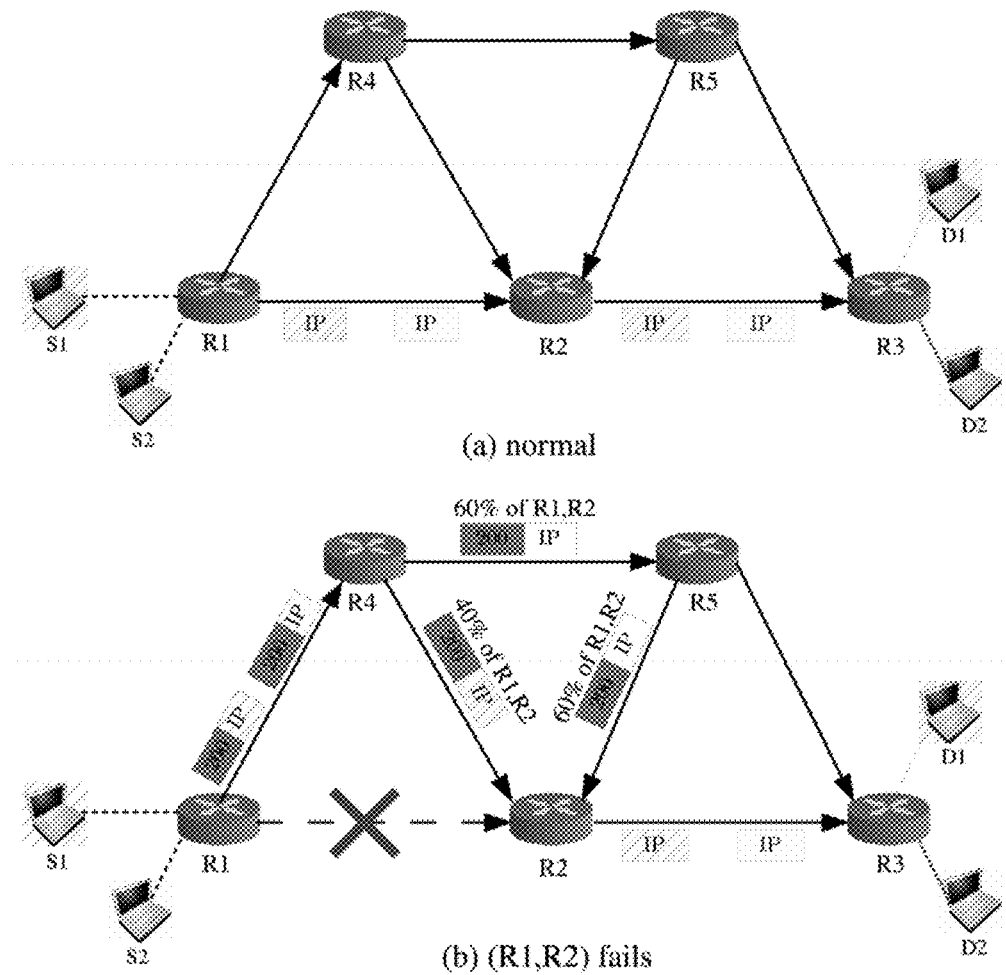
FIG. 1 is a simple example illustrating the failure response of MPLS-fr and the use of label stacking. Specifically.

Embodiments of the present invention now will be described more fully hereinafter with reference to the accompanying drawings, in which some, but not all embodiments of the inventions are shown. Indeed, embodiments of the invention may be embodied in many different forms and should not be construed as limited to the embodiments set forth herein; rather, these embodiments are provided so that this disclosure will satisfy applicable legal requirements. Like numbers refer to like elements throughout.

The present invention broadly discloses a method and system for Resilient Routing Reconfiguration (R3), a routing protection scheme that is (i) provably congestion-free under a wide range of failure scenarios, (ii) efficient in terms of router processing overhead and memory requirement, (iii) flexible in accommodating diverse performance requirements (e.g., different traffic protection levels), and (iv) robust to traffic variations and topology failures. Here by "congestion-free", it means that all traffic demands (except those demands that have lost reachability due to network partition) are routed without creating any link overload. This is a much stronger guarantee than providing reachability alone (as existing protection such as FRR).

At the heart of the approach of embodiments described herein is a general method for covering all possible failure scenarios with a compact set of linear constraints on the amounts of traffic that should be rerouted. Specifically, when F links fail, the traffic originally routed through each failed link has to be rerouted by the remaining network. While the amount of rerouted traffic for a failed link depends on the specific failure scenario, it is always upper bounded by the capacity of the failed link (so long as the routing before the failure is congestion-free). Therefore, by creating a virtual demand for every link in the network (whose volume is equal to its link capacity) and taking the convex combination of all such virtual demands, the method of embodiments can cover the entire space of rerouted traffic under all possible combinations of F link failures. Since the convex hull of virtual demands can be represented as a compact set of linear constraints, linear programming duality can be leveraged to efficiently optimize routing over the entire set. In this way, the method of embodiments eliminates the needs for enumerating failure scenarios by converting topology uncertainty (due to failures) into uncertainty in rerouted traffic, which may be easier to cope with.

Since the virtual demands are upper bounds of the rerouted traffic, the method of embodiments described herein guarantees that if a routing is congestion-free over the virtual demand set, it yields a link protection scheme that is congestion-free under all possible failure scenarios. The converse is also true for single-link failures: if there is a link protection scheme that can guarantee no congestion for all single-link failure scenarios, then there must be a routing that is congestion-free over the entire virtual demand set. Therefore, the seemingly wasteful replacement of rerouted traffic with link capacities is actually efficient.

Based on the foregoing general method of embodiments for converting topology uncertainty to traffic uncertain, embodiments of the present invention further provide a routing protection scheme called Resilient Routing Reconfiguration (R3), which comprises an offline precomputation phase and an online reconfiguration phase. During the offline phase, according to one embodiment, R3 computes routing for the actual demand plus the virtual demand on the original network topology. During the online reconfiguration phase, according to one embodiment, R3 responds to failures using a simple rescaling procedure, which converts the offline precomputed routing into a protection routing that does not traverse any failed links. A unique feature of R3 as described herein is that it is (i) provably congestion free under multiple link failures, and (ii) provably optimal for single-link failure scenarios.

Embodiments of the present invention further provide methods for extending R3 to handle (i) traffic variations, (ii) realistic failure scenarios, (iii) prioritized traffic with different protection levels, and (iv) the tradeoff between performance and resilience.

R3 protection may be implemented using MPLS-fr (a simple extension of MPLS), while the base routing can use either OSPF or MPLS. Emulab evaluation and simulation based on real Internet topologies and traffic traces show that R3 can achieve near-optimal performance and is at least 50% better than existing routing protection schemes, such as OSPF recovergence, OSPF with CSPF fast rerouting, FCP (See K. Lakshminarayanan, M. Caesar, M. Rangan, T. Anderson, S. Shenker, and I. Stoica, "Achieving convergence-free routing using failure-carrying packets," *Proc. ACM SIGCOMM*, August 2007 (Lakshminarayanan et al. 2007)), and Path Splicing (See M. Motiwala, M. Elmore, N. Feamster, and S. Vempala, "Path splicing," *Proc. ACM SIGCOMM*, 2008 (Motiwala et al. 2008)).

To help the reader of this disclosure better understand the present invention, the remainder of this detailed description will be organized as follows. Section 1 formulates the problem of resilient routing protection, and provides an overview of the basic approach of embodiments for converting topology uncertainty into traffic uncertainty. Section 2 provides a detailed description of the basic R3 protection scheme (comprising an offline precomputation phase and an online reconfiguration phase) and its theoretical guarantees. Section 3 describes a prototype Linux implementation of R3. Section 4 evaluates the performance of R3 using both simulations and testbed experiments. Section 5 summarizes the related works. Section 6 concludes.

1. OVERVIEW

A traditional traffic engineering algorithm computes an effective base routing r that optimizes a network metric, such as minimizing congestion cost or maximum link utilization (See, B. Fortz, J. Rexford, and M. Thorup, "Traffic engineering with traditional IP routing protocols," *IEEE Communication Magazine*, October 2002 (Fortz et al. 2002), B. Fortz and M. Thorup, "Internet traffic engineering by optimizing OSPF weights," *Proc. IEEE INFOCOM*, March 2000 (Fortz et al. 2000), M. Roughan, M. Thorup, and Y. Zhang, "Traffic engineering with estimated traffic matrices," *Proc. Internet Measurement Conference (IMC)*, October 2003 (Roughan et al. 2003), H. Wang, H. Xie, L. Qiu, Y. R. Yang, Y. Zhang, and A. Greenberg, "COPE: Traffic engineering in dynamic networks," *Proc. ACM SIGCOMM*, 2006 (Wang et al. 2006)). Then a protection routing p may be derived from r, for example, through fast rerouting (FRR). However, this traditional approach may result in serious network congestion and performance unpredictability under failures. The remainder of this section first formally defines the problem of resilient routing and explains why it is challenging before presenting the key ideas of R3. Notations: Let $G=(V, E)$ be an IP network under consideration, where V is the set of routers in the network, and E is the set of network links connecting the routers. Let d be the traffic matrix between the routers in V, where $d_{ab}$ is the traffic from router a to router b. Let $c_e$ or $c_{ij}$ denote the capacity of a directed link $e=(i, j)$ from router i to router j. i is referred to as the source node of link e and j its tail node. To define routing precisely, the flow representation of routing will be used (See, D. Applegate and E. Cohen, "Making intra-domain routing robust to changing and uncertain traffic demands: Understanding fundamental tradeoffs," *Proc. ACM SIGCOMM*, August 2003 (Applegate et al. 2003), D. Bertsekas and R. Gallager, "Data Networks," *Prentice-Hall*, 1992 (Bertsekas et al. 1992)). Formally, a flow representation of a routing r is specified by a set of values $\{r_{ab}(e)|a, b \in V, e \in E\}$, where $r_{ab}(e)$ or $r_{ab}(i, j)$ specifies the fraction of traffic for the origin-destination (OD) pair $a \rightarrow b$ that is routed over the link $e=(i, j)$. For actual traffic $d_{ab}$ of the OD pair $a \rightarrow b$, the contribution of this traffic to the load on link e is $d_{ab}r_{ab}(e)$. For $\{r_{ab}(e)\}$ to be a valid routing for a given OD pair $a \neq b$, it should satisfy the following conditions:

$$[R1] \; \forall \, i \neq a, b: \sum_{(i,j) \in E} r_{ab}(i, j) = \sum_{(j,i) \in E} r_{ab}(j, i); \quad (1)$$

$$[R2] \; \sum_{(a,i) \in E} r_{ab}(a, i) = 1;$$

$$[R3] \; \forall \, (i, a) \subset E: r_{ab}(i, a) = 0;$$

$$[R4] \; \forall \, e \in E: 0 \leq r_{ab}(e) \leq 1.$$

The first condition indicates flow conservation at any intermediate nodes. The second condition specifies that all traffic from a source should be routed. The third condition prevents traffic from returning to the source. Finally, according to the definition of $r_{ab}(e)$, it is between 0 and 1. Problem formulation: The following basic formulation of resilient routing is considered in this disclosure. In Section 2.4, several useful extensions to the basic formulation are described.

Definition 1 (Resilient Routing) The problem of resilient routing is to design an effective base routing r and protection routing p for traffic matrix d to ensure that the network is congestion free (i.e., the maximum link utilization stays below 100%) under all possible failure scenarios involving up to F failed links. The base routing r can also be given as an input (e.g., by OSPF), in which case only the protection routing p needs to be designed.

Multiple protection routing schemes are possible in practice. To minimize disruption, it is common to only consider protection routing that changes the route of an OD pair when the OD pair traverses a failed link. Among this class of routing reconfiguration techniques, link-based protection is the most widely used and implemented. Thus, the methods of embodiments described herein focus on link-based protection. However, the present invention can easily extend to path-based protection, which can be viewed as a special case of link-based protection in an overlay topology. In link-based protection, the source node of a failed link reroutes the traffic originally passing through a failed link along a detour route to reach the tail node of the link. As a result, the protection routing p only needs to be defined for each link that requires protection. In contrast, the base routing r defines routing for each OD pair.

Challenge in coping with topology uncertainty: Due to the frequency of failures, the delay in failure recovery (See, Iyer et al. 2003, Lakshminarayanan et al. 2007) and the increasingly stringent SLA for network services, it is essential for resilient routing to avoid congestion under multiple link failures overlapping in time. This requires the design of resilient routing to explicitly consider all possible failure scenarios. One natural approach to resilient routing is to enumerate all failure scenarios and derive a routing that works well for all these scenarios. However, this approach faces serious scalability and efficiency issues. Suppose a network with $|E|$ links needs to handle up to F link failures. Then there will be $$\sum_{i=1}^{F} \binom{|E|}{i}$$

failure scenarios, which result in prohibitive computation and configuration cost even for a small number of failures. On the other hand, in order to guarantee congestion-free, it is imperative to protect against all of the $$\sum_{i=1}^{F} \binom{|E|}{i}$$

scenarios, since a skipped scenario may arise in practice and cause network congestion and violation of SLA. Therefore, fundamental challenges in achieving resilient routing involve (i) efficient computation of protection routing that is provably congestion-free even under multiple failures and (ii) simple re-configuration in response to failures.

From topology uncertainty to traffic uncertainty: The key idea of R3 is to convert topology uncertainty (due to the number of failure scenarios) into traffic uncertainty that captures the different traffic demands that need to be rerouted under different failure scenarios.

Specifically, suppose the routing protection scheme is required to protect against up to F arbitrary link failures. Under link-based protection, the rest of the network needs to carry traffic previously carried by the failed links. It is easy to see that the rerouted traffic is upper bounded by the capacity of each failed link (as long as no link is fully utilized under the base routing r). Therefore, every link in the network can induce a virtual demand equal to the link capacity. The convex combination of all such virtual demands should cover the entire space of rerouted traffic. Formally, each link $e \in E$ is associated a virtual demand variable $x_e$. A rerouting virtual demand set $X_F$ is then formed as $$X_F \triangleq \left\{ x \mid 0 \le \frac{x_e}{c_e} \le 1 (\forall e \in E), \sum_{e \in E} \frac{x_e}{c_e} \le F \right\}. \quad (2)$$

For any failure scenario that involves up to F link failures, it can be shown that the traffic that needs to be rerouted always belongs to set $X_F$. Therefore, $X_F$ represents an envelope (i.e., superset) of the rerouted traffic under all possible failure scenarios.

Instead of trying to optimize routing for the fixed traffic matrix d on a variable topology under all possible failure scenarios, the methods of embodiments described herein try to find a routing that works well for the entire demand set $d+X_F$ but on the fixed original topology, where $d+X_F \triangleq \{d+x | x \in X_F\}$ denotes the sum of the actual demand d and the set of virtual demands $X_F$. In this way, the methods of embodiments convert topology uncertainty into traffic uncertainty.

At the first glance, converting topology uncertainty into traffic uncertainty makes the problem more challenging, because the number of failure scenarios is at least finite, whereas $d+X_F$ may contain an infinite number of traffic matrices. However, the rerouting virtual demand set $X_F$ can be represented using a compact set of linear constraints (in Equation 2). By applying linear programming duality, the optimal base routing r and protection routing p for the entire demand set $d \ X_F$ can be found without enumerating traffic matrices.

Another potential concern is that the definition of the rerouting virtual demand set $X_F$ appears rather wasteful. When links $e_1, \ldots, e_F$ fail, the corresponding virtual demands in $X_F$ can be as large as $x_{e_i} = c_{e_i} (i=1, \ldots, F)$. That is, the rerouted traffic on failed link $e_i$ is replaced with a virtual demand equal to the link capacity $c_{e_i}$. Interestingly, it will be proved in Section 2.3 that the seemingly wasteful replacement of rerouted traffic with link capacities is necessary at least for F=1. Specifically, if there exists a link-based protection routing that guarantees no congestion for all single-link failure scenarios, then there must exist a routing that is congestion-free over the entire virtual demand set $d+X_F$.

R3 overview: R3 is designed based on the preceding insight. In one embodiment, R3 comprises the following two main phases:

Offline precomputation. According to one embodiment, during the offline precomputation phase, R3 computes routing r (if not given) for traffic matrix d and routing p for rerouting virtual demand set $X_F$ to minimize the maximum link utilization on the original network topology over the combined demand set $d+X_F$. The optimization is made efficient by leveraging linear programming duality, a technique also exploited by recent research on traffic oblivious routing (See, Applegate et al. 2003, Wang et al. 2006).

Online reconfiguration. According to one embodiment, during the online reconfiguration phase, after a failure, R3 applies a simple procedure called rescaling to convert p (which is defined on the original network topology and thus may involve the failed link) into a protection routing that does not traverse any failed link and thus can be used to reroute traffic on the failed links. The rescaling procedure is efficient and can be applied in real-time with little computation and memory overhead.

A unique feature of the methods of embodiments described herein is that R3 can provide several provable theoretical guarantees. In particular, R3 guarantees no congestion under a wide range of failure scenarios involving multiple link failures. As a result, it provides stronger guarantee than simple reachability. Moreover, the conversion from topology uncertainty into traffic uncertainty is efficient in that the seemingly wasteful replacement of rerouted traffic with link capacity is indeed necessary for single-link failure scenarios. Finally, the online reconfiguration procedure is independent of the order in which the failed links are detected. So routers can apply R3 independently even when the failed links are detected in different orders.

Embodiments of the present invention also provide a number of useful extensions to R3 for (i) coping with traffic variations, (ii) supporting realistic failure scenarios, (iii) accommodating prioritized traffic with different protection levels, and (iv) balancing the trade-off between performance and resilience.

2. RESILIENT ROUTING RECONFIGURATION (R3)

This section presents the detailed design of R3. Specifically, Section 2.1 describes offline precomputation, and Section 2.2 describes online reconfiguration. Section 2.3 proves several theoretical guarantees of R3. Section 2.4 introduces several useful extensions to R3.

2.1 Offline Precomputation

Problem formulation: The goal of offline precomputation is to find routing r for traffic matrix d and routing p for rerouting virtual demand set $X_F$ defined in (2) to minimize the maximum link utilization (MLU) over demand set $d+X_F$. This can be formulated as the optimization problem shown in (3). The objective is to minimize MLU over the entire network. Constraint [C1] ensures that r and p are valid routing, i.e., they both satisfy routing constraints (1). Constraint [C2] enforces all links have utilization below MLU.

$$\text{minimize}_{(r,p)} MLU \quad (3)$$

subject to:

[C1] $r = \{r_{ab}(e) \mid a, b \in V, e \in E\}$ is a routing;

$p = \{p_\ell(e) \mid \ell, e \in E\}$ is a routing;

[C2] $\forall x \in X_F, \forall e \in E$:

$$\frac{\sum_{a,b \in V} d_{ab} r_{ab}(e) + \sum_{l \in E} x_l p_l(e)}{c_e} \leq MLU.$$

Note that p is defined for each link whereas r is defined for each OD pair. Also note that when r is pre-determined (e.g., by OSPF), r becomes an input to the optimization in (3) instead of being an optimization variable.

Solution strategy: The main challenge in solving (3) is that there is a constraint [C2] for every element x belonging to the rerouting virtual demand set $X_F$. Since $X_F$ has an infinite number of elements, the number of constraints becomes infinite. Fortunately, linear programming duality can be applied to convert (3) into an equivalent, simpler linear program with a polynomial number of constraints as follows.

First, constraint [C2] in (3) is equivalent to:

$$\forall e \in E: \frac{\sum_{a,b \in V} d_{ab} r_{ab}(e) + ML(p, e)}{c_e} \leq MLU, \quad (4)$$

where ML(p, e) is the maximum load on e for $\forall x \in X_F$, and thus is the optimal objective of the following problem:

$$\text{maximize}_x \sum_{l \in E} p_l(e) x_l \quad (5)$$

subject to: 
$$\begin{cases} \forall \ell \in E: x_\ell / c_\ell \leq 1 \\ \sum_{\ell \in E} x_\ell / c_\ell \leq F. \end{cases}$$

Here (5) is a linear program when p is a fixed input. From linear programming duality, the optimal objective of (5), ML(p, e), is no more than a given upper bound UB if and only if there exist dual multipliers $\pi_e(l \in E)$ and $\lambda_e$ such that:

$$\sum_{\ell \in E} \pi_e(\ell) + \lambda_e F \leq UB; \quad (6)$$

$\forall \ell \in E: \frac{\pi_e(\ell) + \lambda_e}{c_\ell} \geq p_\ell(e);$ $\forall \ell \in E: \pi_e(\ell) \geq 0;$ $\lambda_e \geq 0.$ Here $\pi_e(l)$ is the dual multiplier for constraint $x_l/c_l \leq 1$, $\lambda_e$ is the dual multiplier for $\Sigma_l x_l/c_l \leq F$, and the subscript e indicates that (5) computes the maximum load on link e.

Since all of the constraints in (6) are linear, (4) can be converted into a set of linear constraints by substituting ML(p, e) with $\Sigma_{l \in E} \pi_e(l) + \lambda_e F$ and incorporating (6). It can be shown that the original problem (3) then becomes the following equivalent linear program, which can be solved using commercial software such as cplex.

$$\text{minimize}_{(r,p,\pi,\lambda)} MLU \quad (7)$$

subject to:

$$\begin{cases} r = \{r_{ab}(e) \mid a, b \in V, e \in E\} \text{ is a routing;} \\ p = \{p_l(e) \mid l, e \in E\} \text{ is a routing;} \\ \forall e \in E: \frac{\sum_{a,b \in V} d_{ab} r_{ab} + \sum_{l \in E} \pi_e(l) + \lambda_e F}{c_e} \leq MLU; \\ \forall e, l \in E: \frac{\pi_e(l) + \lambda_e}{c_l} \geq p_l(e); \\ \forall e, l \in E: \pi_e(l) \geq 0; \\ \forall e \in E: \lambda_e \geq 0 \end{cases}$$

Note that in (7) the base routing r and the protection routing p are jointly optimized. It is also possible to only optimize the protection routing p and have the base routing r as a fixed input. To do so, it suffices to eliminate r as an optimization variable in (7), yielding:

$$\text{minimize}_{(p,\pi,\lambda)} MLU \quad (7)$$

subject to:

$$\begin{cases} p = \{p_l(e) \mid l, e \in E\} \text{ is a routing;} \\ \forall e \in E: \frac{\sum_{a,b \in V} d_{ab} r_{ab} + \sum_{l \in E} \pi_e(l) + \lambda_e F}{c_e} \leq MLU; \\ \forall e, l \in E: \frac{\pi_e(l) + \lambda_e}{c_l} \geq p_l(e); \\ \forall e, l \in E: \pi_e(l) \geq 0; \\ \forall e \in E: \lambda_e \geq 0. \end{cases}$$

Complexity: Linear program (7) has $O(|V|^2 \cdot |E| + |E|^2)$ variables and $O(|V|^3 + |E|^2)$ constraints. Even if the problem to solve only needs to find r to minimize the MLU for fixed traffic matrix d, routing constraints (1) already have $O(|V|^2 \cdot |E|)$ variables and $O(|V|^3)$ constraints. In most networks, $|E|^2 \leq |V|^3$. So (7) only causes moderate increase in the size of the linear program. Finally, note that linear programming duality has also been exploited in recent research on oblivious routing (See, Applegate et al. 2003, Wang et al.

2006). However, oblivious routing requires $O(|V|\cdot|E|^2)$ constraints, which is much higher than (7).

2.2 Online Reconfiguration

After the failure of link e is detected, two main tasks are performed by online reconfiguration. First, the source router of e needs to immediately reroute the traffic originally traversing e through a detour route. Second, in preparation for additional link failures, every router needs to adjust r and p so that no demand traverses the failed link e.

Fast rerouting of traffic on the failed link: After link e fails, the source router of e immediately uses p to derive a detour route $\xi_e$ to reroute the traffic that traverses e before it fails, according to one embodiment. Note that $p_e=\{p_e(l)|l\in E\}$ cannot be directly used as the detour route $\xi_e$, because $p_e$ is defined on the original topology and may assign non-zero traffic to e (i.e., $p_e(e)>0$). Fortunately, $\{p_e(l)|l\neq e\}$ already satisfies routing constraints [R1], [R3] and [R4] in (1). To convert it into a valid detour route $\xi_e$, it suffices to perform the following simple re-scaling to ensure that all traffic originally traversing e is rerouted (thus satisfying [R2]).

$$\xi_e(\ell) = \frac{p_n(\ell)}{1 p_e(e)} (\forall \ell \in E\setminus\{e\}). \quad (8)$$

As an example, consider a simple network with 4 parallel links $e_1$, $e_2$, $e_3$, and $e_4$. Suppose the protection routing p for virtual demand $e_1$ specifies that $p_{e1}(e_1)=0.1$, $p_{e1}(e_2)=0.2$, $p_{e1}(e_3)=0.3$, and $p_{e1}(e_4)=0.4$. After $e_1$ fails, the original traffic traversing $e_1$ needs to be rerouted through $e_2$, $e_3$, and $e_4$ in proportion to $p_{e1}(e_2)$, $p_{e1}(e_3)$, and $p_{e1}(e_4)$. To ensure all such traffic is rerouted, the methods of embodiments scale up all of the fractions by a factor of $$1/(1-p_{e1}(e_1)) = 1/0.9,$$

yielding $\xi_{e1}(e_2) = \frac{2}{9}$, $\xi_{e1}(e_3) = \frac{3}{9}$, and $\xi_{e1}(e_4) = \frac{4}{9}$.

Note that when $p_e(e)=1$, it suffices to simply set $\xi_e(l)=0$. As shown later, under the condition of Theorem, $p_e(e)=1$ implies that there is no (actual or virtual) demand that traverses link e (and thus needs to be rerouted).

Adjusting r and p to exclude the failed link: In preparation for additional link failures, R3 adjusts r and p to ensure that no (actual or virtual) demand traverses the failed link e, according to one embodiment. This can be achieved by moving the original traffic allocation on link e to the detour route $\xi_e$. Specifically, let $E'=E\setminus\{e\}$ and $G'=(V, E')$. The updated base routing r' is defined as:

$r'_{ab}(l)=r_{ab}(l)+r_{ab}(e)\cdot\xi_e(l), \forall(a,b)\in V, \forall l\in E'$, where $r_{ab}(l)$ is the original allocation on link for OD pair $a\rightarrow b$, and $r_{ab}(e)\cdot\xi_e(l)$ gives the increase due to using $\xi_e$ to reroute the original allocation on the failed link (i.e., $r_{ab}(e)$). Similarly, the updated protection routing p' is defined as:

$p'_{uv}(l)=p_{uv}(l)+p_{uv}(e)\cdot\xi_e(l), \forall(u,v)\in E', \forall l\in E'$.

Efficiency: All of the operations in online reconfiguration are simple and thus highly efficient. Specifically, computing $\xi_e$ from p only requires simple rescaling of $\{p_e(l)\}$. Even such simple rescaling can be avoided if the methods of embodiments directly store $p_e(e)$ and $$\xi_e = \left\{\frac{p_e(\ell)}{1-p_e(e)} \mid \ell \neq e\right\}$$

instead of $\{p_e(l)|l\in E\}$. Meanwhile, updating $r'_{ab}(e)$ and $p'_{uv}(l)$ is also extremely simple and is only required for demands with non-zero traffic allocation on the failed link (i.e., $r_{ab}(e)>0$ and $p_{uv}(e)>0$). Note that R3 does not require all routers to finish updating their r and p before it recovers from the failed link e—the recovery reaches full effect as soon as the source router of e starts rerouting traffic through the detour route $\xi_e$.

3.3 Theoretical Guarantees of R3

Sufficient condition for congestion-free guarantee: A key feature of R3 is that it can provide provable congestion-free guarantee under all possible failure scenarios as long as the optimal MLU in (7) is below 1. More formally:

Theorem 1 Let $X_F$ be the rerouting virtual demand set with up to F link failures, as defined in (2). If offline precomputation (Section 2.1) finds routing r and p such that the MLU for the entire demand set $d+X_F$ is no larger than 1 on the original topology $G=(V, E)$, then online reconfiguration (Section 2.2) guarantees that the MLU for the real traffic matrix d and the rerouted traffic is no larger than 1 under any failure scenario with up to F failed links.

Proof: Let e be the first failed link. Let $E'=E\setminus\{e\}$. Let r' and p' be the updated routing after online reconfiguration. Let $X_{F-1}$ be the rerouting virtual demand set with up to F-1 failures in E'. Below it will be shown that r' and p' guarantee that the MLU for demand set $d+X_{F-1}$ is no larger than 1 on the new topology $G'=(V, E')$. Consider any $l\in E'$ and $x\in X_{F-1}$. Let L (d, x, r', p', l) be the load on link l coming from real traffic d and virtual demand x using base routing r' and protection routing p'. The following holds:

$$L(d, x, r', p', \ell) = \sum_{a,b\in V} d_{ab}r'_{ab}(\ell) + \sum_{(u,v)\in E} x_{uv}(p')_{uv}(\ell) \quad (9)$$

$$= \sum_{a,b\in V} d_{ab}(r_{ab}(\ell) + r_{ab}(e)\xi_e(\ell)) +$$

$$\sum_{(u,v)\in E} x_{uv}(p_{uv}(\ell) + p_{uv}(e)\xi_e(\ell))$$

$$= L(d, x, r, p, \ell) + L(d, x, r, p, e) \cdot \frac{p_e(\ell)}{1-p_e(e)}$$

Given $x\in X_{F-1}$, $y\in X_F$ can be obtained by adding a virtual demand for the failed link e to x. That is, $y_e=c_e$ and $y_{uv}=x_{uv}$ for $\forall(u, v)\in E'$. Since r and p guarantee no congestion for $d+X_F$, the following holds:

$$c_l \geq L(d,y,r,p,l)=L(d,x,r,p,l)+c_e\cdot p_e(l) \quad (10)$$

$$c_e \geq L(d,y,r,p,e)=L(d,x,r,p,e)+c_e\cdot p_e(e) \quad (11)$$

From (11) and when $p_e(e)<1$, it follows that:

$$c_e \geq L(d,x,r,p,e)/(1-p_e(e)). \quad (12)$$

Substituting $c_e$ in (10) with the R.H.S. of (12), the following is obtained:

$$c_{l'} \geq L(d, x, r, p, l') + L(d, x, r, p, e)\frac{p_e(l')}{1 - p_e(e)} \quad (13)$$

Combining (9) and (13), it is clear that $c_{l'} \geq L(d, x, r', p', l)$ (for $\forall l \in E'$). Note that this also holds when $p_e(e)=1$. In this case, under the assumption that MLU$\leq$1, no other actual or virtual demand traverses e and thus needs to be rerouted. So R3 can simply set $\xi_e(l)=0$ and $L(d, x, r', p', l)=L(d, x, r, p, l) \leq c_l$. Therefore, r' and p' guarantees that the MLU for $d+X_{F-1}$ on G'=(V, E') is no larger than 1. Consequently, r' guarantee that the MLU for d is no larger than 1. By induction, it then follows that d is congestion-free for any failure scenario with up to F failed links. Note that depending on the value of F and the connectivity of G, it may not be possible to find r and p that meet the sufficient condition. For example, if there exist F failures that partition the network, then it is impossible to find r and p to ensure that the MLU is no larger than 1 for the entire demand set $d+X_F$. Interestingly, the evaluation results in Section 4 show that when such scenario occur, the online reconfiguration of R3 can automatically remove those demands that have lost reachability due to the partition of the network (by setting $\xi_e(l)=0$ when $p_e(e)=1$). Moreover, by choosing r and p that minimize the MLU over the entire demand set $d+X_F$, R3 is able to achieve much lower MLU than existing methods.

Necessary condition for single-link failures: A potential concern on the resilient routing is that it may be rather wasteful, as it requires the routing to maintain MLU within 1 when routing both real traffic and rerouting virtual demand up to the link capacity. However, it is actually more economical than it seems. In particular, Theorem shows that the requirement in Theorem is tight for single-link failures (i.e., F=1). Evaluation results in Section 4 will further show it is efficient under general failure scenarios.

Theorem 2 Let $X_1$ be the rerouting virtual demand set for single-link failures, as defined in (2). If there exists base routing r and link-based protection routing p* such that for all cases of single-link failures, the MLU (due to both regular traffic and rerouted traffic) is no larger than 1 and there is no traffic loss, then there exists p such that with r and p, $d+X_1$ can be routed without creating any congestion.

Proof: Let $L(d, r, e) = \Sigma_{a,b \in V} d_{ab} r_{ab}(e)$ be the load on link e due to real traffic d and base routing r. Then p can be explicitly constructed as follows.

$$\forall e, l \in E: p_e(l) = \begin{cases} 1 - \frac{L(d, r, e)}{c_e}, & \text{if } l = e; \\ p_e^*(l) \cdot \frac{L(d, r, e)}{c_e}, & \text{otherwise.} \end{cases} \quad (14)$$

The analysis below will show that the resulted routing p together with the base routing r ensures that there is no congestion for demand set $d+X_1$. According to linear programming, the MLU for routing (r,p) over the entire demand set $d+X_1$ will be reached at an extreme point of $d+X_1$, which corresponds to having a single $x_e/c_e=1$ and all the other $x_l/c_l=0$ ($\forall l \neq e$). It is easy to see that for $\forall l \neq e$, the following holds:

$$L(d, x, r, p, l) = L(d, r, l) + x_e p_e(l)$$
$$= L(d, r, l) + c_e \frac{L(d, r, e)}{c_e} p_e^*(l)$$
$$= L(d, r, l) + L(d, r, e) p_e^*(l).$$

That is, L(d, x, r, p, l) is the same as the link load on l when protection routing $p^*_e$ is used to reroute traffic traversing the failed link e, which is no larger than $c_l$ by assumption. Meanwhile, it is easy to see that:

$$L(d, x, r, p, e) = L(d, r, e) + x_e p_e(e)$$
$$= L(d, r, e) + c_e\left(1 - \frac{L(d, r, e)}{c_e}\right)$$
$$= c_e.$$

Therefore, the MLU is no larger than 1 under routing (r, p) and the entire demand set $d+X_1$.

Order independent online reconfiguration: In case multiple link failures occur close in time, it is possible that different routers may detect these failures in different order. Theorem ensures that the online reconfiguration procedure in Section 2.2 will eventually result in the same routing as long as different routers eventually discover the same set of failed links. In other words, the order in which the failures are detected does not affect the final routing. This is useful because different routers can then apply R3 in a distributed, independent fashion without requiring any central controller to synchronize their routing states.

Theorem 3 The online reconfiguration procedure is order independent. That is, any permutation of failure sequence $e_1$, $e_2$, ..., $e_n$ always result in the same routing after applying online reconfiguration for each failed link.

Proof: It suffices to show that routing after two topology changes is the same regardless of their order, because it will immediately follow by induction that that the routing after more than 2 topology change events, say $e_{i1}, e_{i2}, \ldots, e_{in}$, can be converted to $e_1, e_2, \ldots, e_n$, by swapping two topology changes at a time, and that such swapping results in the same routing due to the order independence of two topology changes.

To prove that routing after two topology changes is the same regardless of their order, let f(d, e)' denote the routing after $e_0$ changes, and f(d, e)" denote the routing after $e_0$ and $e_1$ change. Then f(d, $e_0$)"=0 and f(d, $e_1$)"=0 since after $e_0$ and $e_1$ failures no traffic is routed through these two links. Therefore f(d, e) is symmetric when e=$e_0$ or e=$e_1$. Next, the goal is to show that f(d, e) is symmetric when e≠$e_0$ and e≠$e_1$. The update rule ensures that f(d, e)'=f(d, e)+f(d, $e_0$)×f($e_0$, e)/(1−f($e_0$, $e_0$)). Similarly, the following holds:

$$f(d, e)'' = f(d, e)' + f(d, e_1)' \times f(e_1, e)' / (1 - f(e_1, e_1)')$$
$$= f(d, e) + f(d, e_0) \times f(e_0, e) / (1 - f(e_0, e_0)) +$$
$$\frac{[f(d, e_1) + f(d, e_0) \times f(e_0, e_1)/(1 - f(e_0, e_0))]}{1 - f(e_1, e_1) - f(e_1, e_0) \times f(e_0, e_1)/(1 - f(e_0, e_0))} \times$$
$$\frac{[f(e_1, e) + f(e_1, e_0) \times f(e_0, e)/(1 - f(e_0, e_0))]}{1 - f(e_1, e_1) - f(e_1, e_0) \times f(e_0, e_1)/(1 - f(e_0, e_0))}$$

Let a00=1−f($e_0$, $e_0$), a11=1−f($e_1$, $e_1$), b01=f($e_0$, $e_1$), and b10=f($e_1$, $e_0$). It can be shown that:

$$f(d, e)'' = f(d, e) + f(d, e_0) \times f(e_0, e)/a00 +$$

$$\frac{\begin{bmatrix} f(d, e_1) + \\ f(d, e_0) \times b01/a00 \end{bmatrix} \times \begin{bmatrix} f(e_1, e) + \\ b10 \times f(e_0, e)/a00 \end{bmatrix}}{a11 - b10 \times b01/a00}$$

$$= f(d, e) + f(d, e_0) \times f(e_0, e)/a00 +$$

$$\frac{\begin{bmatrix} a00 \times f(d, e_1) + \\ f(d, e_0) \times b01 \end{bmatrix} \times [f(e_1, e) + b10 \times f(e_0, e)/a00]}{a00 \times a11 - b10 \times b01}$$

$$= f(d, e) + f(d, e_0) \times f(e_0, e)/a00 +$$

$$a00 \times f(d, e_1) \times f(e_1, e) +$$

$$\frac{f(d, e_0) \times f(e_0, e) \times b01 \times b10/a00}{a00 \times a11 - b10 \times b01} +$$

$$\frac{b10 \times f(d, e_1) \times f(e_0, e) + b01 \times f(d, e_0) \times f(e_1, e)}{a00 \times a11 - b10 \times b01}$$

$$= f(d, e) +$$

$$a00 \times f(d, e_1) \times f(e_1, e) +$$

$$\frac{f(d, e_0) \times f(e_0, e) \times b01 \times b10/a00}{a00 \times a11 - b10 \times b01} +$$

$$\frac{(a00 \times a11 - b10 \times b01) \times f(d, e_0) \times f(e_0, e)/a00}{a00 \times a11 - b10 \times b01} +$$

$$\frac{b10 \times f(d, e_1) \times f(e_0, e) + b01 \times f(d, e_0) \times f(e_1, e)}{a00 \times a11 - b10 \times b01}$$

$$= f(d, e) +$$

$$\frac{a00 \times f(d, e_1) \times f(e_1, e) - a11 \times f(d, e_0) \times f(e_0, e)}{a00 \times a11 - b10 \times b01} +$$

$$\frac{b10 \times f(d, e_1) \times f(e_0, e) + b01 \times f(d, e_0) \times f(e_1, e)}{a00 \times a11 - b10 \times b01}$$

Therefore $f(d, e)'' - f(d, e)$ is symmetric with respect to $e_0$ and $e_1$.

2.4 R3 Extensions

Handling traffic variations: So far only a fixed traffic matrix d is considered. In practice, traffic varies over time. To accommodate such variations, according to one embodiment, a traffic engineering system may collect a set of traffic matrices $\{d_1, \ldots, d_H\}$ and use their convex combination to cover the space of common traffic patterns (e.g., see, Y. Zhang and Z. Ge, "Finding critical traffic matrices," *Proc. DSN '05*, 2005 (Zhang et al. 2005a), Roughan et al. 2003, Wang et al. 2006). That is, the fixed traffic matrix d is replaced with the convex hull of $\{d_1, \ldots, d_H\}$:

$$D \triangleq \{d | d = \Sigma_{h=1}^H t_h d_h, \Sigma_{h=1}^H t_h = 1, t_h \geq 0 (\forall h)\}$$

Constraint [C2] in (3) then becomes:

$$\forall d \in D, \forall x \in X_F, \forall e \in E: \quad (15)$$

$$\frac{\sum_{a,b \in V} d_{ab} r_{ab}(e) + \sum_{l \in E} x_l p_l(e)}{c_e} \leq MLU$$

As in Section 2.1, linear programming duality can be applied to convert (15) into a set of linear constraints.

Handling realistic failure scenarios: So far R3 protection has considered arbitrary K link failures. Embodiments of the present invention provide a method to take into account of structure in realistic failure scenarios and classify failure events into the following two classes:

Shared Risk Link Group (SRLG). A SRLG consists of a set of links that are disconnected simultaneously. For example, due to sharing of lower layer physical components (e.g., optical switch), multiple IP layer links may always fail together. Another example is the high-bandwidth composite links, in which a single member link down will cause all links in the composite link to be shut down. Let $F_{SRLG}$ be the set consisting of all SRLGs. Each element in $F_{SRLG}$ consists of a set of links.

Maintenance Link Group (MLG). A network operator may shut down a set of links in the same maintenance operation. Let $F_{MLG}$ be the set consisting of all MLG events. Each element $F_{MLG}$ consists of a set of links.

To capture these failure characteristics, the method of embodiments introduces an indicator variable $I_f$, where $I_f = 1$ if and only if the basic event set f is down. Then (5) is changed to (16), where the first constraint limits the maximum number of concurrent SRLGs, the second constraint expresses the fact that maintenance is carefully scheduled so that at most one MLG undergoes maintenance at any instance of time, and the last constraint encodes the fact that the rerouting traffic for a link is upperbounded by whether the link belongs to any SRLG or MLG. Linear programming duality can then be applied in a similar way to compute resilient routing.

$$\text{maximize} \sum_{l \in E} p_l(e) x_l \quad (16)$$

subject to:

$$\begin{cases} \sum_{f \in F_{SRLG}} I_f \leq K \\ \sum_{f \in F_{MLG}} I_f \leq 1 \\ \forall e \in E: \frac{x_e}{c_e} \leq 1 \\ \forall e \in E: \frac{x_e}{c_e} \leq \sum_{f \in F_{SRLG}: e \in f} I_f + \sum_{f \in F_{MLG}: e \in f} I_f \end{cases}$$

Supporting prioritized resilient routing: So far, R3 considers all traffic requires equal protection. Operational networks increasingly provide different levels of SLAs for different classes of traffic. For example, some traffic has more stringent SLA requirement and require tolerating more overlapping link failures. An SLA requirement can be translated into the number of overlapping link failures to tolerate. Embodiments of the present invention provide a method to extend R3 to enable prioritized resilient routing by associating traffic demand with a protection level, where protection level i indicates tolerating up to i link failures.

Let $F_i$ be the number of link failures that traffic with protection level i should tolerate. Let $d^i$ be the total traffic demands that require protection level i or higher. Let $X_{F_i}$ be the rerouting virtual demand set with up to $F_i$ failures. Then the goal of R3 is to find (r, p) such that for any i, the network has no congestion for the entire demand set $d^i + X_{F_i}$. To achieve this goal, according to one embodiment, it suffices to simply replace [C2] in (3) with (17), which can again be converted into linear constraints by applying linear programming duality.

$$\forall i, \forall x^i \in X_{F_i}, \forall e \in E: \quad (17)$$

$$\frac{\sum_{a,b \in V} d^i_{ab} r_{ab}(e) + \sum_{l \in E} x^i_l p_l(e)}{c_e} \leq MLU.$$

As an example, consider a network has three classes (VPNs) of traffic, with decreasing priority levels: IPFR (IP-enabled Frame Relay) $d_F$, PNT (Private Network Transport) $d_P$, and general IP $d_I$. Then the algorithm computes $d^1=d_F+d_P+d_I$, indicating that all three classes of traffic should survive any single-link failure scenario; $d^2=d_F+d_P$, indicating that IPFR and PNT must be protected by up to two-link failures, and $d^3=d_F$, indicating that IPFR demand should be protected up to three links fail. This essentially means that resilient routing should carry $d^1+X_1$, $d^2+X_2$, and $d^3+X_3$, where $X_i$ denotes the rerouting virtual demand set with up to i link failures.

Trade-off between performance and resilience: A potential concern about optimizing performance for failures is that good performance after failures may come at the expense of poor performance when there are no failures. To address this issue, R3 can bound MLU under no failures to be close to the optimal. This can be achieved by adding additional constraints, called a penalty envelop, to the previous optimization problem:

$$\Sigma_{a,b \in V} d_{ab} r_{ab}(e) \leq MLU_{opt} \times \beta,$$

where $MLU_{opt}$ is MLU under optimal routing and $\beta \geq 1$ is an operator-specified input that controls how far the normal-case performance is away from the optimal. With these constraints, the methods of embodiment not only optimize performance under failures but also ensure acceptable performance under normal conditions. $\beta$ is a tunable parameter. A small $\beta$ improves the normal-case performance at the cost of degrading the performance after failures by reducing the feasible solution space over which the optimization takes place.

3. R3 LINUX IMPLEMENTATION

To evaluate the feasibility and effectiveness of R3 in real settings, a prototype of R3 is implemented in Linux (kernel version 2.6.25). This section describes the R3 implementation.

3.1 Overview

A key challenge in implementing R3 protection routing is its flow-based representation of p, because current routers do not readily support such a routing scheme.

One way to address the issue is to convert a flow-based routing to a path-based routing, e.g., using the flow decomposition technique (See H. Wang, Y. R. Yang, P. H. Liu, J. Wang, A. Gerber, and A. Greenberg, "Reliability as an inter-domain service," *Proc. ACM SIGCOMM*, August 2007 (Wang et al. 2007)). A path-based routing can then be implemented using MPLS. A problem of this approach is that after each failure the protection routing should be rescaled and the rescaled protection routing may decompose to new sets of paths, which have to be signaled and setup.

Due to this problem, embodiments of the present invention provide a more efficient implementation. According to the embodiments described herein, MPLS is chosen as the base mechanism since it is widely supported by all major router vendors. A flow-based routing using MPLS, called MPLS-fr, is implemented. MPLS-fr involves a simple modification to MPLS and can be easily implemented by router vendors. For wider interoperability, R3 may also be implemented using traditional MPLS, but with larger overhead.

3.2 MPLS-fr

Forwarding Data Structure: In standard MPLS, when an MPLS packet with label l arrives at a router, the router looks up the label l in a table named incoming label mapping (ILM), which may map the label to a forward (FWD) instruction. The FWD contains a next-hop label forwarding entry (NHLFE), which specifies the outgoing interface for packets with the incoming label.

MPLS-fr extends MPLS forwarding information base (FIB) data structure to allow multiple NHLFE entries in a FWD instruction. Furthermore, each NHLFE has a next-hop splitting ratio. Thus, after looking up the label of an incoming packet in ILM, the router selects one of the NHLFE entries contained in the FWD according to the splitting ratios.

Implementing Next-hop Splitting Ratios: Consider the implementation of the protection routing for link (a, b). Let $l_{ab}$ be the label representing (a, b). For all traffic at router i with label $l_{ab}$, router i should split the traffic so that the fraction of traffic to neighbor j is $$\frac{P_{ab}(i,j)}{\sum_{j',(i,j') \in E,(i,j') \neq (a,b)} p_{ab}(i,j')}.$$

One straightforward approach of implementing splitting is random splitting. However, this may cause packets of the same TCP flow to follow different routes, which will generate out-of-order packets and degrade TCP performance. To avoid unnecessary packet reordering, packets belonging to the same TCP flow should be routed consistently. This is achieved using hashing, according to one preferred embodiment. The hash function should satisfy two requirements: (i) The hash of the packets belonging to the same flow should be equal at the same router. (ii) The hash of a flow at different routers should be independent of each other (i.e., the input to the hash should include router ID in addition to flow identification fields). If the hash value is only determined by the flow, the probability distribution of the hash values might be "skewed" on some routers. For example, for flow ab, if router i only forwards the packets with hash values between 40 and 64 to router j, then router j may never see packets in flow ab with hash values less than 40.

To meet these two requirements, according to one embodiment, the implementation uses a hash function that takes as input both the flow fields in the packet header (Source IP Address, Destination IP Address, Source Port, Destination Port) and a 96-bit router-dependent private number based on router ID. The output of the hash function is a 6-bit integer.

3.3 Routing Reconfiguration Using MPLS-fr and Label Stacking

With MPLS-fr support, resilient routing reconfiguration may be implemented easily. In an implementation of the methods of embodiment, a central server performs precomputation of protection routing p, establishes a label for each protected link, signals of MPLS-fr setup, and distributes p. The central server can be integrated with Routing Control Platform (See N. Feamster, H. Balakrishnan, J. Rexford, A. Shaikh, and K. van der Merwe, "The case for separating routing from routers," *Proc. ACM SIGCOMM* 2004 *FDNA Workshop*, September 2004 (Feamster et al. 2004)) or Path Computation Element (PCE) (See A. Farrel, J.-P. Vasseur, and J. Ash, "A Path Computation Element (PCE)-based Architecture," *RFC* 4655, August 2006 (Farrel et al. 2006)). Online reconfiguration is distributed, and conducted by each router locally. It has three components: failure detection and notification, failure response, and protection routing update. Below details on each component will be given.

Failure Detection and Notification: Link failure may be detected using layer 2 interface monitoring, according to one embodiment. Upon a local failure event, a notification is generated and flooded to all other routers in the network through ICMP packets with type 42. In operational networks, failure detection and notification can be made more efficient using the deployed network management infrastructure. For example, SRLG failure can be detected by risk modeling algorithm based on network monitoring (See R. R. Kompella, J. Yates, A. Greenberg, and A. C. Snoeren, "IP fault localization via risk modeling," Proc. NSDI, 2005 (Kompella et al. 2005)). The detection could be conservative (e.g., if any link in a SRLG down, assume all links in SRLG down). Also, the operator can issue preparation notifications to all routers before starting a MLG maintenance operation.

Failure Response: After a failure is detected, MPLS-fr for the detected failure is activated by label stacking FIG. 1 is a simple example illustrating the failure response. An IP packet of flow (S1,D1) reaches router R1. R1 looks up the packet using the base forwarding table and decides that the next-hop for this packet is R2. Normally, the packet follows the base routing and is sent to R2.

If link (R1,R2) fails, R1 activates the protection routing for (R1,R2), looks up the protection label 200 for link (R1,R2) in ILM, and pushes label 200 onto the MPLS stack of the packet. The lookup in ILM indicates that the next-hop neighbor is R4, so R1 forwards the packet to R4. When the packet reaches router R4, R4 looks up the ILM for the incoming label 200. For the protection label 200, R4 has two NHLFEs: 40% of the flows to R2, and 60% to R5. Assume that the hash of flow (S1,D1) on R4 selects R2, then R4 forwards the packet to R2. Similarly, protection traffic for flow (S2,D2) through R4 can be carried by R5. At R2, the protection label of the packet will be popped. The packet will be forwarded to R3 following the remaining base routing of OD pair (R1,R3). When the network recovers from a failure event, the base routing is immediately re-activated and the protection routing is disabled.

Protection Routing Update: After a failure, each router needs to update the protection routing (i.e., reconfiguring next-hop splitting ratios) for other protected links. To facilitate local update, each router stores p in its RIB (routing information base), according to one embodiment. The resulting storage requirement is $O(|E|^2)$. Considering backbone routers already maintain the network topology information (e.g., in Link State Database), this additional storage overhead may be acceptable.

Due to the order independence of rescaling, when multiple failures happen in a network, different routers can perform rescaling on its local copy of p. When all routers are notified of all failures, the routers will have a consistent protection routing p. During the transition process, different routers may have inconsistent p, which may lead to transit loops. If transit loops are of concern, techniques, such as failure-carry packets (FCP) (See Lakshminarayanan et al. 2007), can be integrated with R3.

4. EVALUATIONS

This section evaluates R3 using both real experiments and extensive simulations based on realistic network topologies and traffic traces.

4.1 Evaluation Methodology

Network Topology: The simulations use the PoP-level topology of a large tier-1 ISP network, called US-ISP. In addition, the simulations also use PoP-level topologies of three IP networks, Level-3, SBC, and UUNet (2003), as inferred by RocketFuel (N. Spring, R. Mahajan, and D. Wetherall, "Rocketfuel: An ISP topology mapping engine," Available from http://www.cs.washington.edu/research/networking/rocketfuel/). The backbones of these networks are obtained by recursively merging the leaf nodes of the topologies with their parents until no nodes have degree one. OC192 is used as the capacity for links in the RocketFuel topologies. A topology generator GT-ITM is also used to generate a large backbone topology. For experimental results, the Abilene backbone topology (2006) is created on Emulab (See B. White, J. Lepreau, L. Stoller, R. Ricci, S. Guruprasad, M. Newbold, M. Hibler, C. Barb, and A. Joglekar, "An integrated experimental environment for distributed systems and networks," Proc. OSDI, December 2002). The link capacities are scaled down to be 100 Mbps. The link delay is configured to be measured values. Table 1 summarizes the used topologies. The data for US-ISP are not shown due to privacy concerns.

TABLE 1

Summary of network topologies used.

| Network | Aggregation level | # Nodes | # D-Links |
|---|---|---|---|
| Abilene | router-level | 11 | 28 |
| Level-3 | PoP-level | 17 | 72 |
| SBC | PoP-level | 19 | 70 |
| UUNet | PoP-level | 47 | 336 |
| Generated | router-level | 100 | 460 |
| US-ISP | PoP-level | — | — |

Traffic: Real hourly traffic demand matrices are obtained from US-ISP for a one-week period. For RocketFuel topologies, the gravity model (See Y. Zhang, M. Roughan, C. Lund, and D. L. Donoho, "An information-theoretic approach to traffic matrix estimation," Proc. ACM SIGCOMM, August 2003 (Zhang et al. 2003)) is used to generate synthetic traffic demands. To generate realistic traffic during the experiments on Emulab, the Abilene traffic matrix is extracted from measurement data and the values are scaled down. Then traffic for each OD pair is generated at the rate encoded in the traffic matrix. CAIDA Anonymized 2008 Internet traces is used for real-time IP packet generation.

Failure Scenarios: To evaluate the performance under failures, the evaluation enumerates all possible single- and two-link failures, and randomly samples around 1100 scenarios of three- and four-link failures. Random sampling is used for three- and four-link changes due to the large number of all possible such failures. This sampling is only needed for quantifying the performance under failures and not required for computing protection routing, since R3 does not require enumeration of failure scenarios. In addition, for US-ISP, real maintenance link groups (i.e., the sets of links that were under maintenance together) are obtained for a 6-month period, and each maintenance link group as is treated as a single failure event.

Performance Metrics: For simulation results, two performance metrics are used: (1) bottleneck traffic intensity, and (2) performance ratio. Bottleneck traffic intensity measures network congestion. The performance ratio of an algorithm is defined as the ratio between the bottleneck traffic intensity of the algorithm and that of optimal routing, under the same network topology and traffic demand, and measures how far the algorithm is from being optimal under the given network topology and traffic demand. It is always no less than 1, and a higher value indicates that the performance of the algorithm is farther away from the optimal. The evaluation further examines the router storage overhead and the efficiency of resilient routing reconfiguration using measurement data from Emulab experiments.

Algorithms: The following two base routing schemes are considered:

OSPF: This is widely used in IP/MPLS networks for traffic engineering. For US-ISP, the IGP weight optimization technique in Fortz et al. 2000 is used to compute a set of optimized weights for each day during the evaluation period based on the 24 traffic demand matrices of that day.

MPLS-fr: The base routing is computed using the algorithms in Section 2.

In some cases, the evaluation also shows the optimal bottleneck traffic intensity that can be achieved using flow-based routing. This is the optimal routing for each given network topology and traffic. It is unrealistic to implement, because it requires complete change of routing after the network topology and/or traffic changes, and could cause large disruption to network traffic. It is used only as a lower bound for evaluating the performance of other algorithms and to compute the performance ratios.

The following protection algorithms are considered:

CSPF-detour: This algorithm is widely used in fast rerouting. The bypass routing for a set of failed links is computed using OSPF algorithm with the failed links removed. The implementation of the bypass routing is generally based on standard MPLS.

OSPF reconvergence (recon): In this algorithm, the OSPF routing protocol is allowed to re-compute routing for every changed topology.

Failure-Carrying Packet (FCP): This is the algorithm as described in Lakshminarayanan et al. 2007. In this algorithm, individual data packet keeps track of topology changes that have been encountered by the packet, and the packet is routed along the OSPF path in the current snapshot of topology.

Path Splicing (PathSplice): This algorithm is proposed in Motiwala et al. 2008. The evaluation computes k=10 slices with a=0, b=3 and $$\text{Weight}(a,b,i,j)=(\text{degree}(i)+\text{degree}(j))/\text{degree}_{max},$$

where $\text{degree}_{max}$ is the maximal node degree of the network. When forwarding traffic, if a router detects the outgoing link for a destination unavailable, it detours the traffic destined to this destination through other connected slices using uniform splitting.

R3: The protection routing is computed using the algorithms in Section 2.

Flow-based optimal link detour routing (opt): This is the optimal link detour routing for each given traffic and failure scenario. Specifically, for each failure scenario f, this scheme computes an optimal protection plan (i.e., a rerouting for each link in f). Since the detour routing varies according to each failure scenario, it is challenging to implement in a scalable way. Its performance is considered as a lower bound of practical protection algorithms.

4.2 Simulation Results

US-ISP: To preserve confidentiality of US-ISP, the absolute traffic intensity on the bottleneck link is not reported. Instead, normalized bottleneck traffic intensity is reported. Specifically, for each interval in the trace, the evaluation computes the bottleneck traffic intensity using optimal flow-based routing when there is no failure. The evaluation then normalizes the traffic intensity during different intervals by the highest bottleneck traffic intensity observed in the trace.

Figure 2:
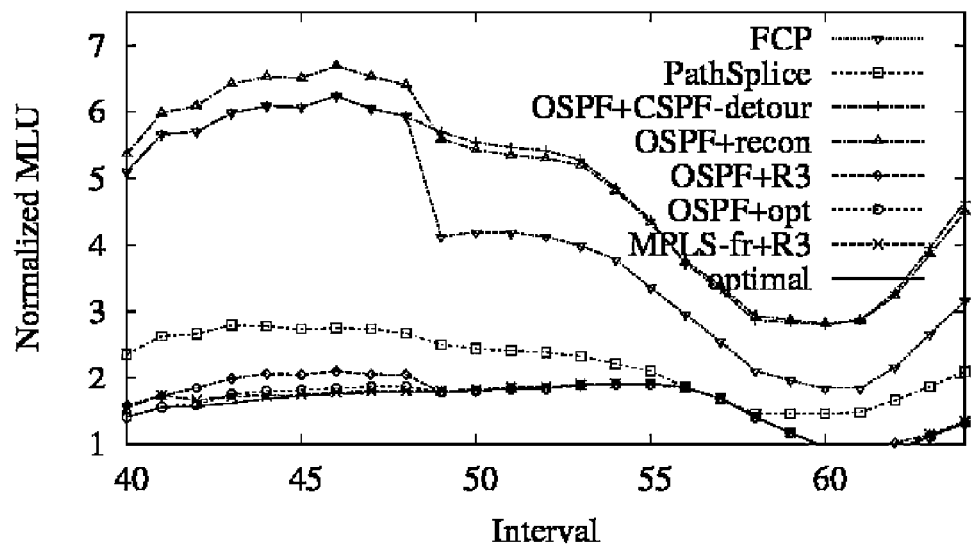
FIG. 2 illustrates the time series of worst-case normalized traffic intensity with one failure during a given day for US-ISP.

Single failure: Initially, only one failure event (SRLG or MLG) is introduced. At each interval, the network topology deviates from the base topology by only one failure event. The worst case performance upon all possible single failure events is identified. The normalized traffic intensity on the bottleneck link is then reported. FIG. 2 shows the results. For clarity, the figure zooms in to a one-day time frame during the evaluation period; thus, there are 24 intervals. The following observations can be made. First, R3 based protection (MPLS-fr+R3 and OSPF+R3) performs close to the optimal, and achieves performance similar to flow-based optimal link detour routing on top of OSPF (OSPF+opt). However, flow-based optimal link detour (opt) requires the computation of optimal protection routing for each individual topology-change scenario, whereas R3 achieves similar performance with only a single protection routing and a simple, lightweight routing reconfiguration. Second, comparing the two R3 schemes, MPLS-fr+R3 performs better than OSPF+R3 (see intervals 40 to 48). This is expected since OSPF is less flexible than MPLS. Third, without a good protection scheme, OSPF+recon, OSPF+CSPF-detour, and FCP all lead to higher levels of normalized traffic intensity. In the early part of the day, their traffic intensity can be as high as 3 times that of the other routing protection schemes (~5 vs. ~1.5). Fourth, starting from interval number 49, FCP starts to have better performance than OSPF+recon, OSPF+CSPF-detour. But its traffic intensity in the later part of the day can still be as high as 2 times (e.g., during interval number 60) that of MPLS-fr+R3, OSPF+R3 and OSPF+opt. Finally, by rerouting traffic to multiple slices in a "best effort" fashion, Path-Splice leads to less congestion and achieves much better performance than other existing protection algorithms, though it is still less efficient than R3 based algorithms.

Figure 3:
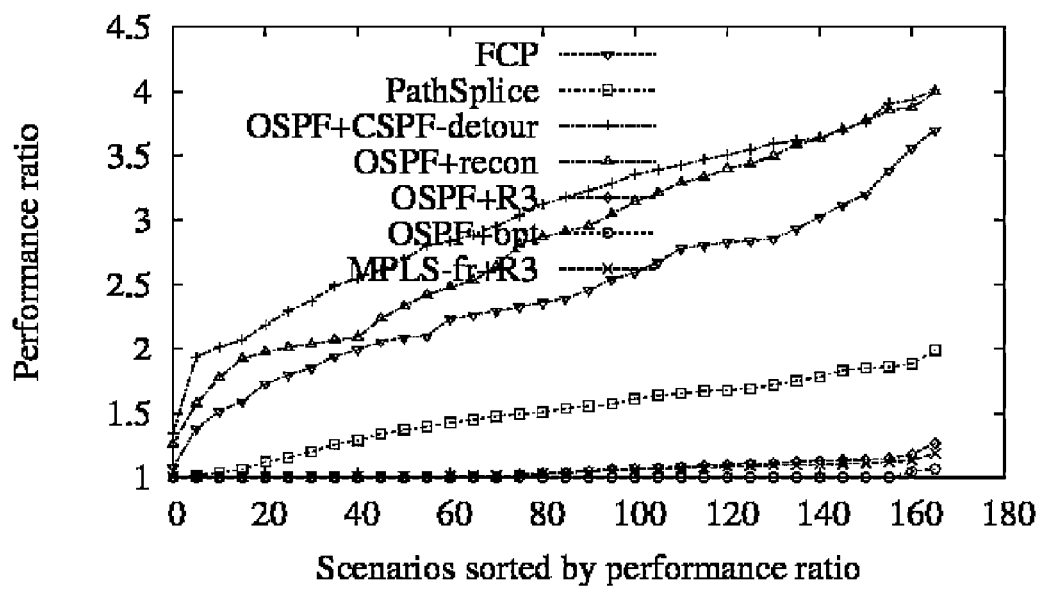
FIG. 3 summarizes the overall performance with one failure during the entire evaluation period (which lasts seven days) for US-ISP.

The previous evaluation shows the effectiveness of R3 during one day. The next evaluation summarizes the overall performance during the entire evaluation period (which lasts seven days). FIG. 3 shows the performance ratio versus the time interval sorted based on the performance ratio. The following observations can be made. First, MPLS-fr+R3, OSPF+R3, and OSPF+opt consistently perform within 30% of the optimal throughout the entire evaluation period. Second, OSPF+recon, OSPF+CSPF-detour, PathSplice, and FCP all cause significant performance penalty. The performance of OSPF+recon, OSPF+CSPF-detour, and FCP can be 260% higher than optimal. PathSplice performs better, but it still can be 100% higher than the optimal while R3 based schemes are within 30%. Thus, the traffic intensity of PathSplicing can be 54% higher than R3.

Figure 4A:
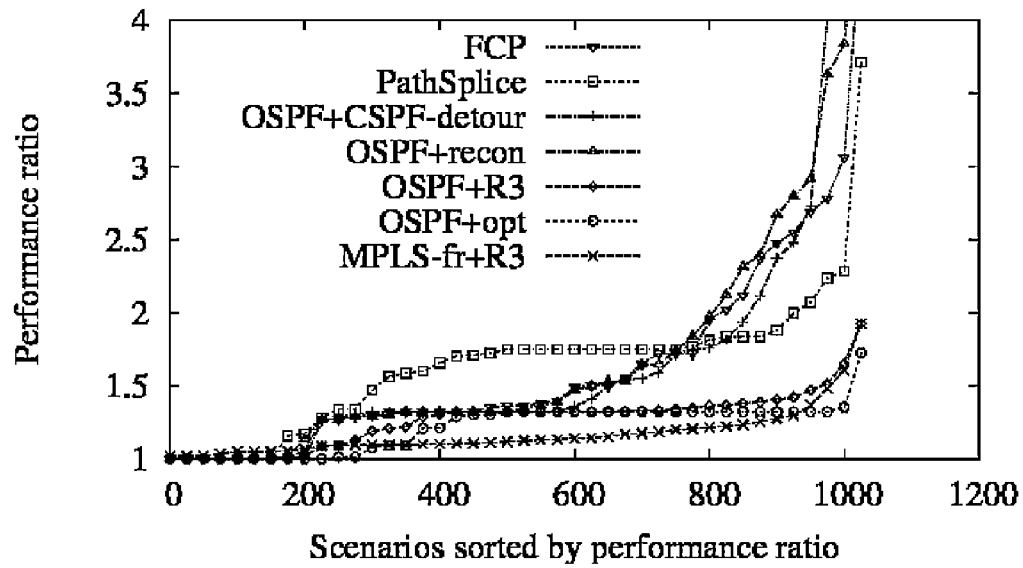
FIG. 4A and FIG. 4B summarize the performance under two-link or three-link failures during peak hour for US-ISP.
Figure 4B:
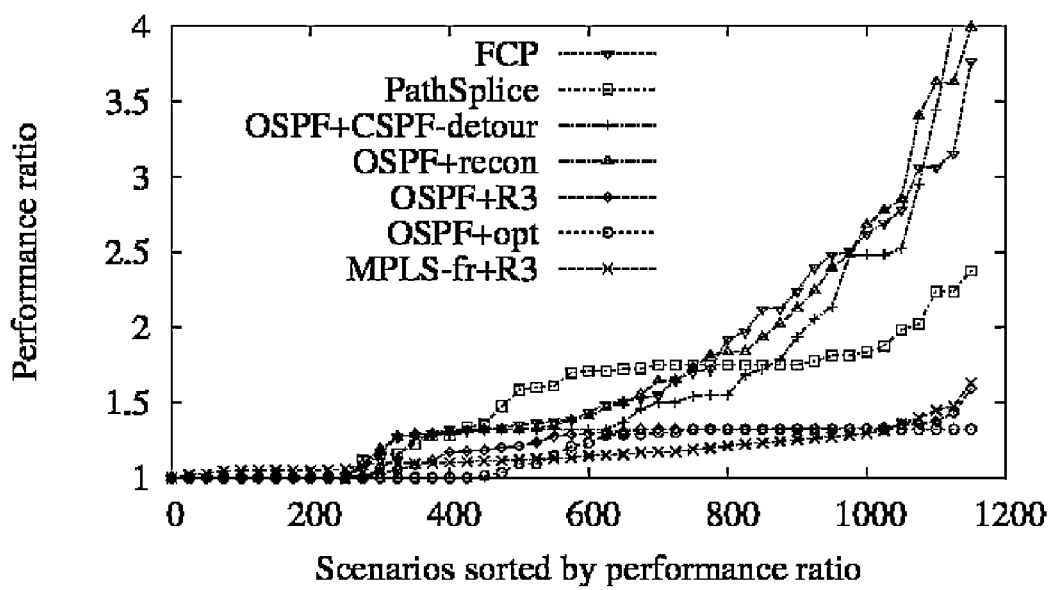

Multiple failure events: Next, multiple failure events are introduced in US-ISP. For clarity of presentation, the evaluation fixes the interval (a peak hour) and evaluates the failure events. The results are reported for two failures and sampled three failures. Only sampled three failures are reported because there are too many failure scenarios to enumerate; thus, random sampling is used. FIG. 4 shows the performance ratio versus the scenario sorted based on the performance ratio. To make it easier to read, the y-axis of FIG. 4 is truncated at the value of 4. It is evident that under two and three failures, MPLS-fr+R3 and OSPF+R3 continue to significantly out-perform OSPF+recon, OSPF+CSPF-detour, FCP, and PathSplice. From FIG. 4A, it can be seen that OSPF+recon, OSPF+CSPF-detour, FCP and PathSplice can cause bottleneck traffic intensity to be more than 3.7 times of the optimal for two failures. This is 94% higher than the highest of MPLS-fr+R3 and OSPF+R3 (they reach around 1.9). For three failures, OSPF+recon, OSPF+CSPF-detour, FCP, and PathSplice reach at least 2.4 times of optimal, while MPLS-fr+R3 and OSPF+R3 reach only 1.6; thus they are at least 50% higher than R3 based protection.

Summary: For US-ISP, R3 based schemes consistently achieve better performance than OSPF+recon, FCP, and Path- Splice, outperforming them by at least 50% in all scenarios and much higher in some scenarios.

Rocketfuel Topologies: Next, the evaluation uses the RocketFuel topologies. For each RocketFuel topology, the evaluation randomly generates one traffic matrix using gravity model. Due to lack of SRLG information, the evaluation generates all two-link failures and randomly samples 1100 three-link failures. The evaluation then compares the performance of different algorithms under these failures.

Figure 5A:
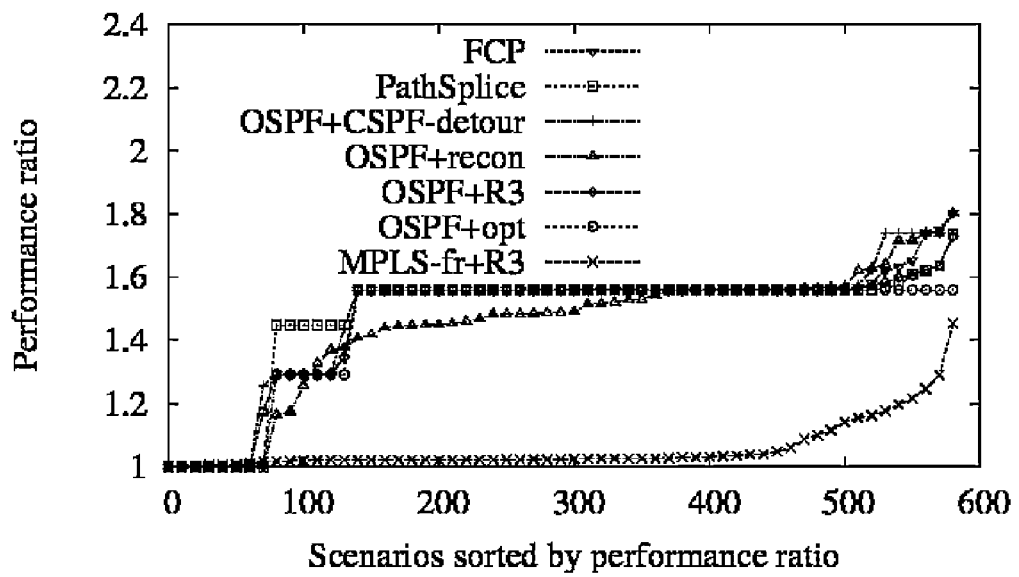
FIG. 5A and FIG. 5B summarize the performance under two-link or three-link failures for SBC.
Figure 5B:
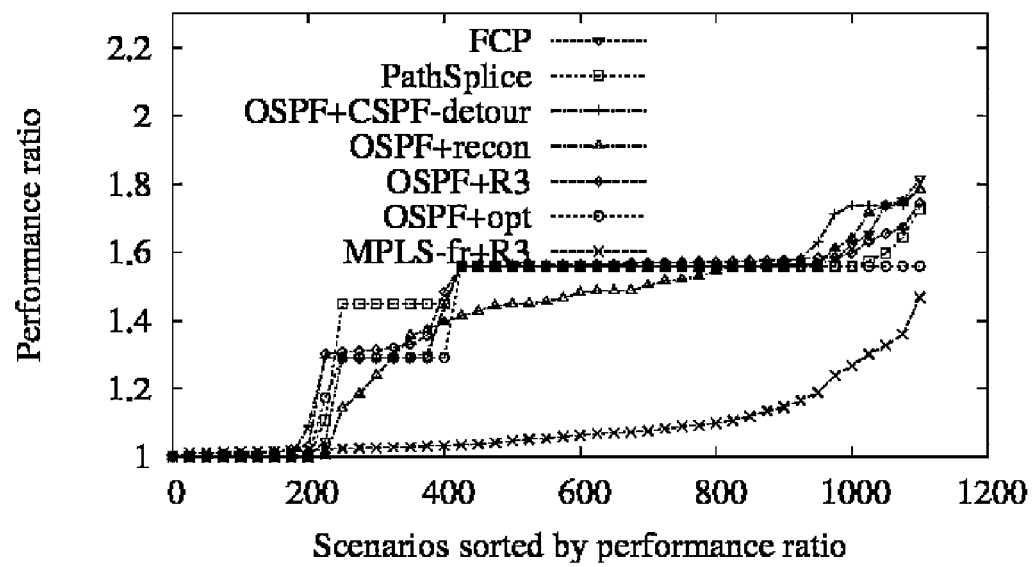
Figure 6A:
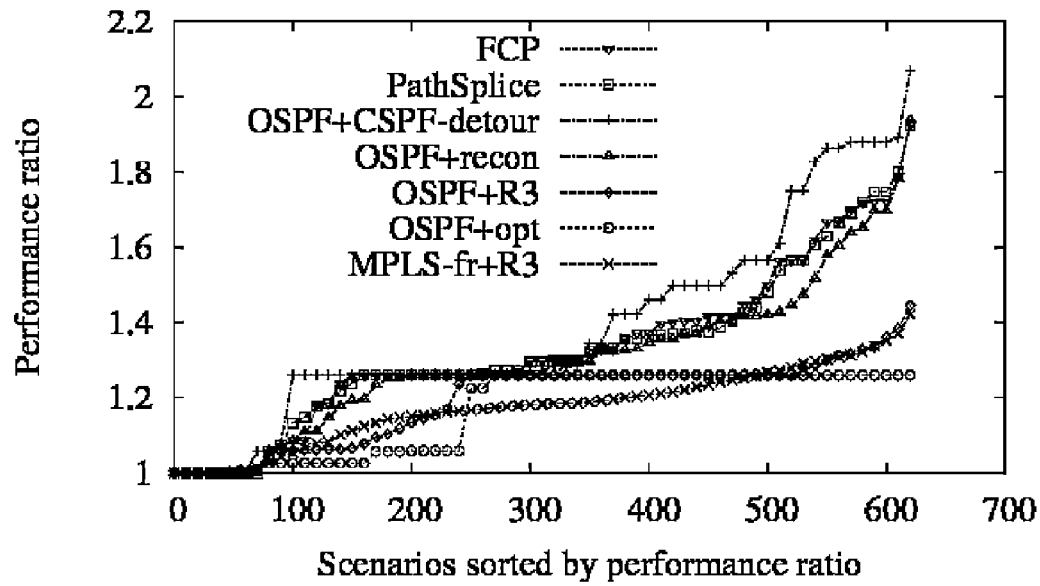
FIG. 6A and FIG. 6B summarize the performance under two-link or three-link failures for Level 3.
Figure 6B:
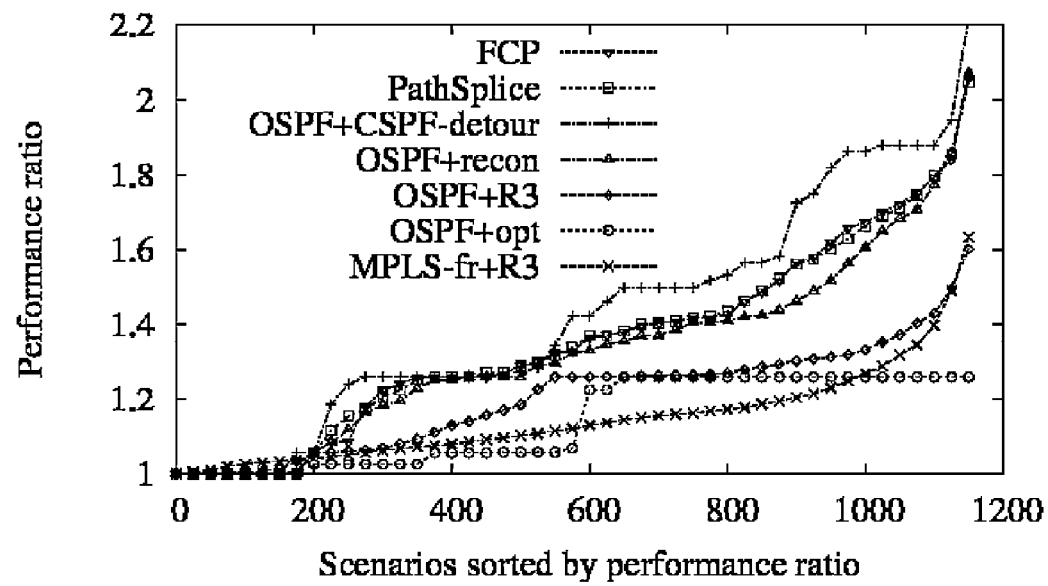

FIG. 5 and FIG. 6 show the performance ratios for the SBC network and Level 3, respectively. These two topologies are chosen because they give representative results among the Rocketfuel topologies. From these figures, the following observations can be made. First, on SBC, MPLS-fr+R3, with its jointly optimized base routing and protection routing, significantly out-performs all OSPF based algorithms, including OSPF+opt. This demonstrates the advantage of joint optimization of base routing and protection routing. Second, on Level 3, MPLS-fr+R3 and OSPF+R3 have very similar performance, and consistently out-perform other OSPF based algorithms, except for OSPF+opt. In fact, on Level 3, OSPF+opt performs very close to optimal and slightly better than MPLS-fr+R3 and OSPF+R3. Recall that it is substantially more expensive to implement OSPF+opt, this indicates that on networks with very good OSPF routings, R3 on top of OSPF can be used to achieve most of the gains of R3 while retaining the simplicity of OSPF routing.

Prioritized R3: Prioritized R3 is evaluated using three classes of traffic with different priorities. Specifically, the evaluation extracts traffic of IPFR and PNT from the US-ISP backbone traffic in a peak interval. The evaluation then subtracts these two types of traffic from the total traffic and treats the remaining traffic as IP. The traffic volumes of the two VPNs are rescaled for confidentiality. For prioritized R3, the protection levels of IPFR, PNT, and IP are set to four failures, two failures, and one failure, respectively. For general R3, all traffic is protected against one failure. The evaluation then reports results for all single failures, 100 worst-case two-failure scenarios, and sampled four-failure scenarios.

Figure 7A:
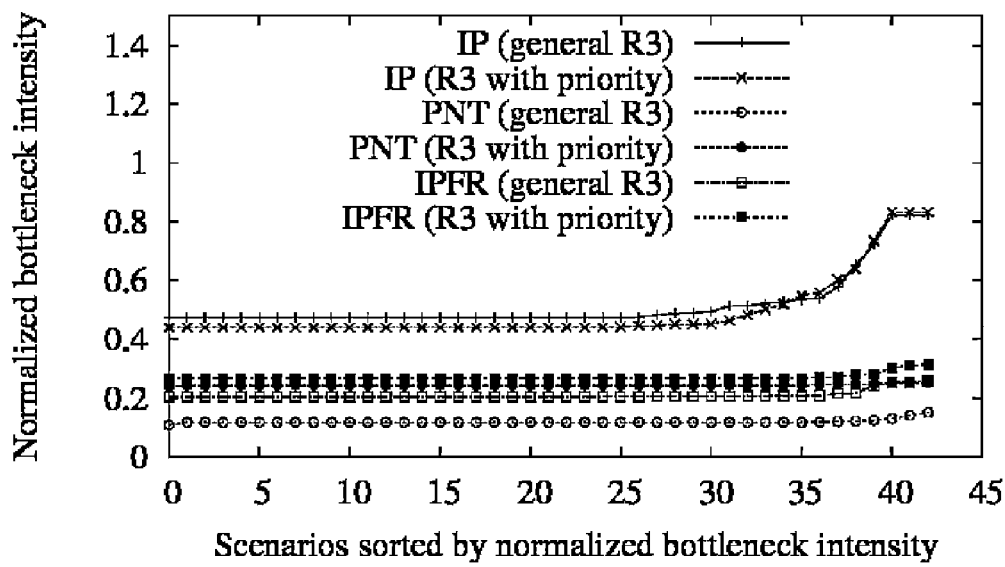
FIG. 7A-7C show the normalized bottleneck traffic intensities for the three classes of traffic under R3 with and without priority.
Figure 7B:
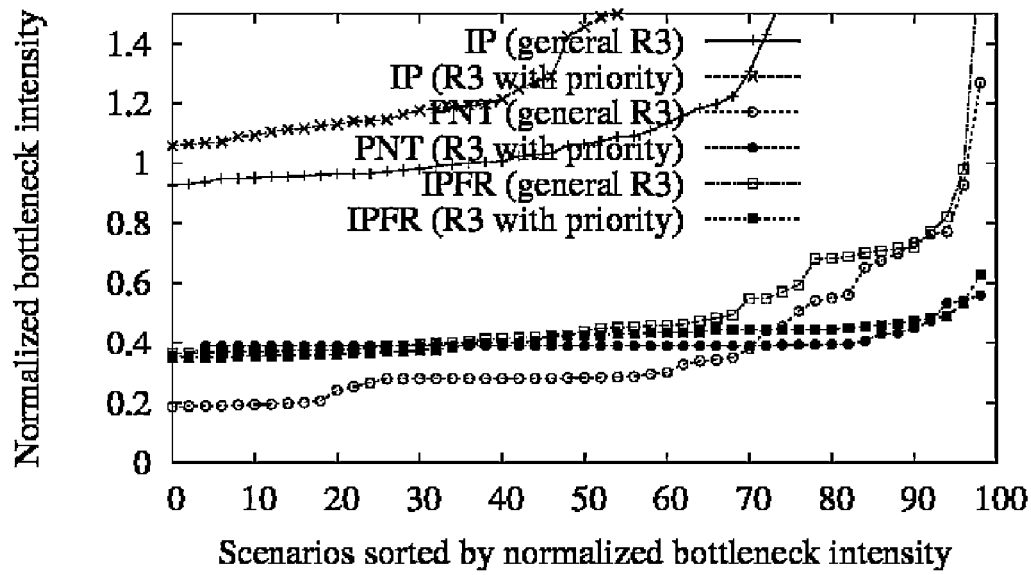
Figure 7C:
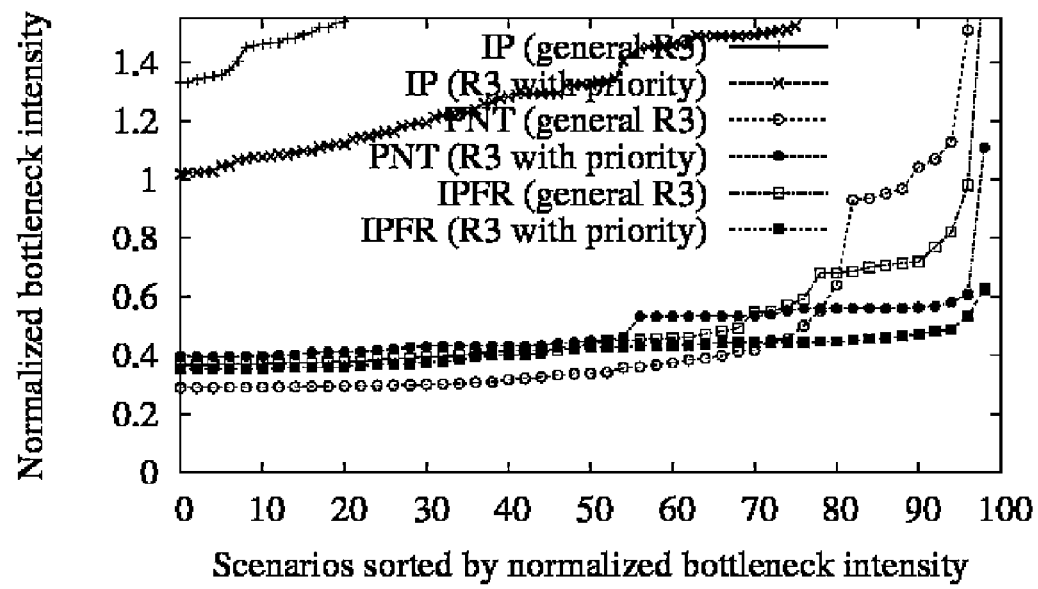

FIG. 7 shows the normalized bottleneck traffic intensities for the three classes of traffic under R3 with and without priority. The following observations can be made. First, both prioritized and general R3 provide congestion-free rerouting under single failures. Comparing the performance between prioritized and general R3, it is evident that IP traffic has lower bottleneck traffic intensity under prioritized R3 than under general R3, while the bottleneck traffic intensities of PNT and IPFR under prioritized R3 are slightly higher than under general R3. The reason for the latter is because even though IP traffic has lower priority than PNT and IPFR under multiple failures, prioritized R3 can give IP better treatment under single failures as long as PNT and IPFR traffic are well protected, which is the case (i.e., the bottleneck traffic intensities of PNT and IPFR are always smaller than 0.4 under single failures). Second, under two-link failures, prioritized R3 guarantees congestion-free for IPFR and PNT, whereas IPFR and PNT experience congestion under general R3. The bottleneck traffic intensities of IP traffic is higher under prioritized R3 than under general R3, which is inevitable due to the limited resources. Third, under four-link failures, IPFR incurs no congestion using prioritized R3, whereas all traffic experience congestion using general R3. Even PNT, which is protected up to two-link failures, experience lower traffic intensities under prioritized R3 than under general R3. As expected, IP traffic experiences congestion under both general and prioritized R3 during four-link failures. These results demonstrate that prioritized R3 is effective in providing differentiated treatment to different traffic.

Figure 8:
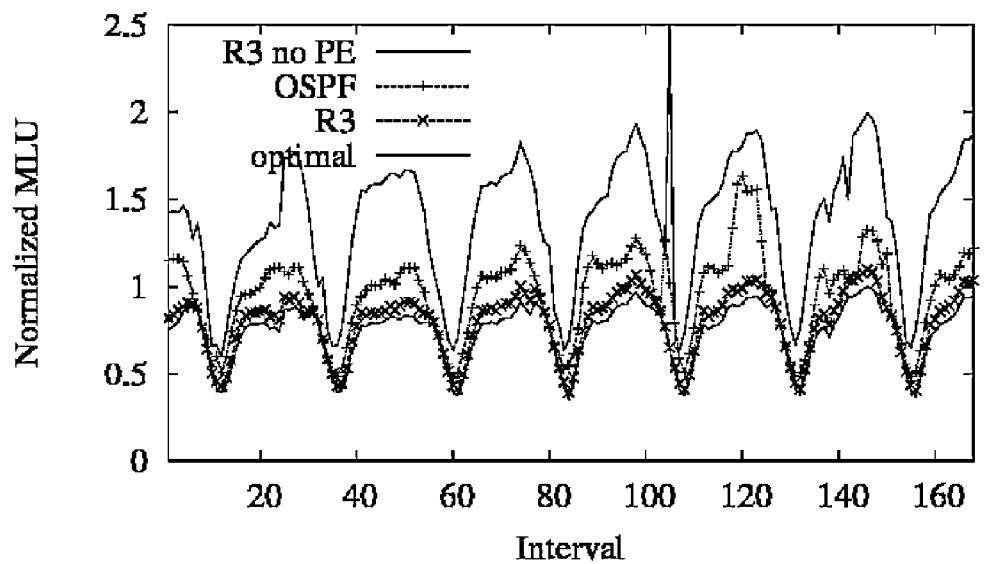
FIG. 8 shows the benefit of penalty envelope by comparing the performance of four algorithms: R3 without penalty envelope, OSPF, R3 with penalty envelope, and optimal.

Penalty Envelope: In R3 formulation, a penalty envelope can be introduced on normal case MLU. The goal is to balance the need between being robust to topology changes and being optimal when there are no topology changes. To motivate the importance of this technique, the evaluation below examines the network performance under no topology changes. FIG. 8 shows the performance of four algorithms: R3 without penalty envelope, OSPF, R3 with penalty envelope, and optimal. The evaluation picks a time period when OSPF performs particularly well with optimized IGP weights. The following observations can be made. First, adding the penalty envelope significantly improves normal case performance. The 10% penalty envelope is effective and R3 performs within the envelope during normal operations. Second, R3 without penalty envelope can lead to significant performance penalty in normal case. Its normalized traffic intensity sometimes goes as high as 200% of the optimal and may perform even worse than OSPF. This is because R3 without penalty envelope optimizes exclusively for the performance under failures and only enforces no congestion during normal network topology and traffic.

Figure 9A:
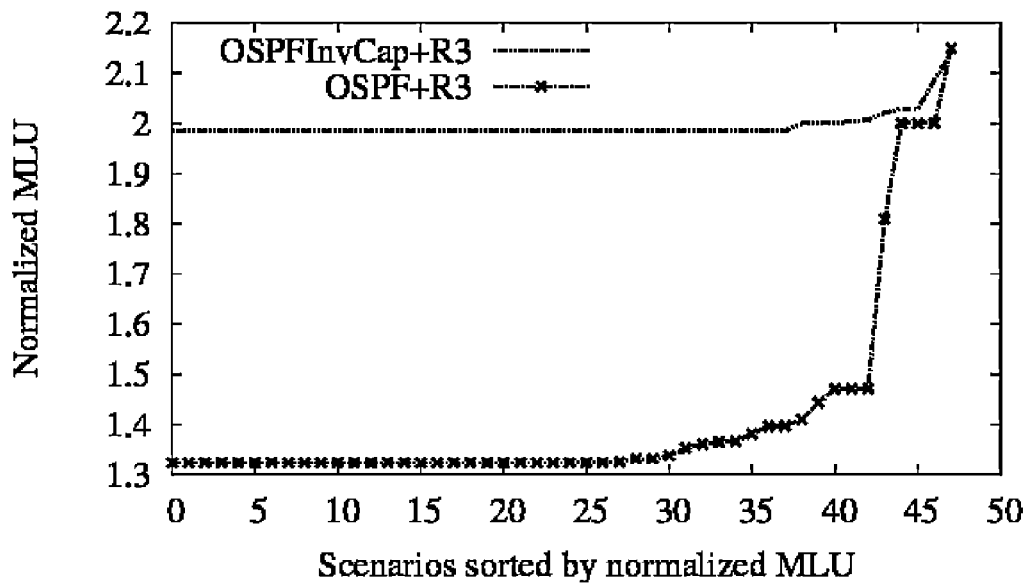
FIG. 9 shows the effect of base routing on the performance under one-link failures (FIG. 9A) and two-link failures (FIG. 9B).
Figure 9B:
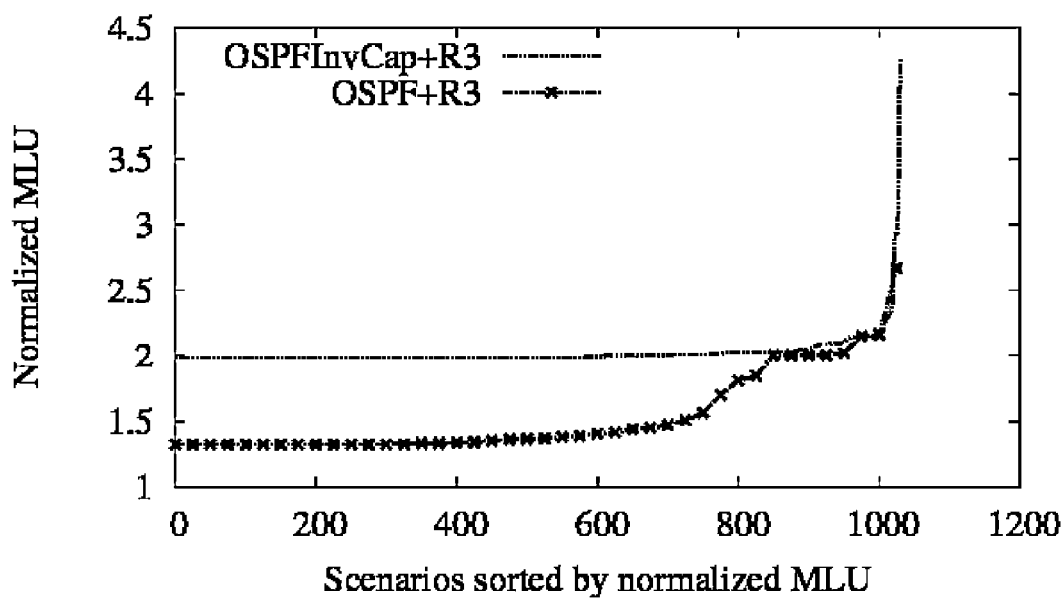

Robustness on Base Routing: The previous evaluation shows that R3, which jointly optimizes base routing and protection routing, out-performs OSPF+R3. So a better base routing leads to better overall performance. To further understand the impact of base routing, the following evaluation is conducted. Specifically, two versions of OSPF are used as the base routing: (i) OSPFInvCap+R3 and (ii) OSPF+R3, where in the former the IGP weights of the base routing is inverse proportional to link capacity and in the latter IGP weights are optimized. As shown in FIG. 9, R3 based on OSPFInvCap is significantly worse than R3 based on an optimized OSPF routing. These results further demonstrate the importance of base routing.

4.3 Implementation Results

The evaluation below examines the efficiency of the Linux implementation of R3.

Offline Computation Complexity: To evaluate the computation complexity of R3, R3 offline precompuation is run for the 8 topologies with different failure guarantees. All the computation is done using a single Linux machine with commodity hardware configuration (2.33 GHz CPU, 4 GB memory). Table 2 summarizes the results. It shows that the precomputation phase takes no more than half an hour for major ISP backbones. It also shows that the computation time does not change significantly with an increasing number of protected link failures due to the compact representation of failure scenarios.

TABLE 2

R3 Offline Precomputation Time (seconds).

| Network/# failures | 1 | 2 | 3 | 4 | 5 | 6 |
|---|---|---|---|---|---|---|
| Abilene | 0.3 | 0.30 | 0.30 | 0.32 | 0.33 | 0.29 |
| Level-3 | 1.80 | 1.97 | 2.56 | 2.71 | 2.46 | 2.43 |
| SBC | 1.46 | 1.76 | 1.75 | 1.76 | 1.92 | 1.91 |
| UUNet | 1010 | 572 | 1067 | 810 | 864 | 720 |
| Generated | 1388 | 929 | 1971 | 2001 | 1675 | 2131 |
| US-ISP | 21.3 | 21.9 | 21.4 | 20.1 | 22.1 | 21.8 |

Storage and MPLS Overhead: One concern about R3 protection implementation based on MPLS-fr is router storage overhead (i.e., FIB and RIB size), given that routers need to maintain the protection labels for all protected links and store local copies of the protection routing p. To evaluate the storage overhead, for a given topology, R3MPLS-fr protection is run assuming that all backbone links are protected except the stub links which cannot be bypassed. The evaluation measures the ILM table size, the NHLFE table size, the FIB size, and the RIB size per router. Table 3 summarizes the results for 6 topologies. It shows that all of these 6 network topologies can be protected by R3 with modest FIBs (<267 KB) and RIBs (<20 MB).

TABLE 3

Router storage overhead of R3 implementation.

| Network | # ILM | # NHLFE | FIB memory | RIB storage |
| --- | --- | --- | --- | --- |
| Abilene | 28 | 71 | <9 KB | <83 KB |
| Level-3 | 72 | 304 | <36 KB | <535 KB |
| SBC | 70 | 257 | <31 KB | <503 KB |
| UUNet | 336 | 2402 | <267 KB | <11 MB |
| Generated | 460 | 2116 | <251 KB | <20 MB |
| US-ISP | — | — | <39 KB | <656 KB |

A related overhead is R3 usage of MPLS labels. Recall that the number of MPLS labels used by MPLS-fr for protection routing is bounded by the number of links in the network. Since many routers can support at least tens of thousands of MPLS labels, the number of MPLS labels used in protection routing may not be an issue.

Effective Resilient Routing Reconfiguration: Next, the evaluation examines the effectiveness of protection routing. The evaluation generates failure scenarios by disconnecting three links (Houston-Kansans, Chicago-Indianapolis, Sunnyvale-Denver) sequentially on the emulated Abilene topology (each link is two directed links). After failing one link, there is about one-minute delay before failing the next link. During the evaluation, bursty traffic is generated to allow measurement of the traffic throughput between every OD pair, the traffic intensity on each link, and the aggregated loss rate at each egress router (the traffic matrix encodes the expected outgoing traffic).

Figure 10A:
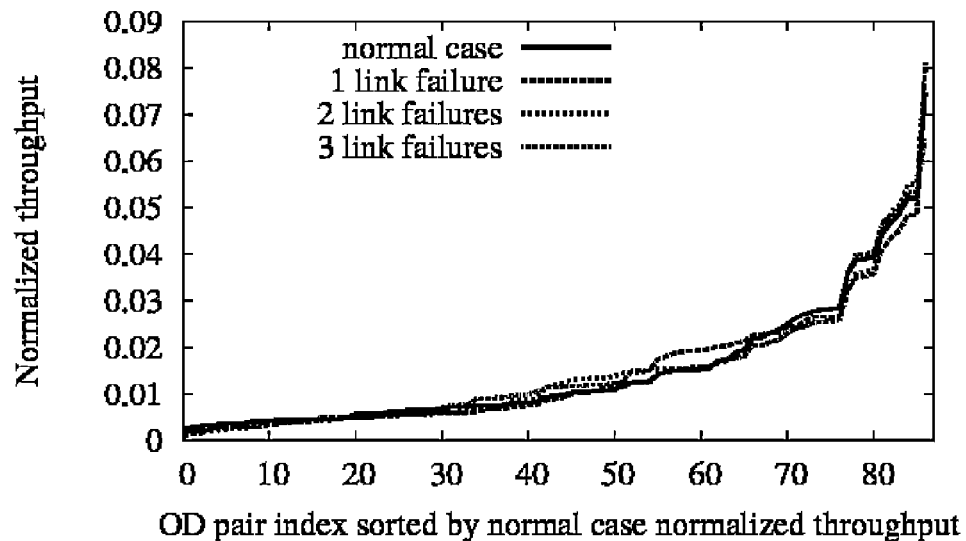
FIG. 10A-10C summarizes the network performance using R3 Linux implementation under multiple link failures.
Figure 10B:
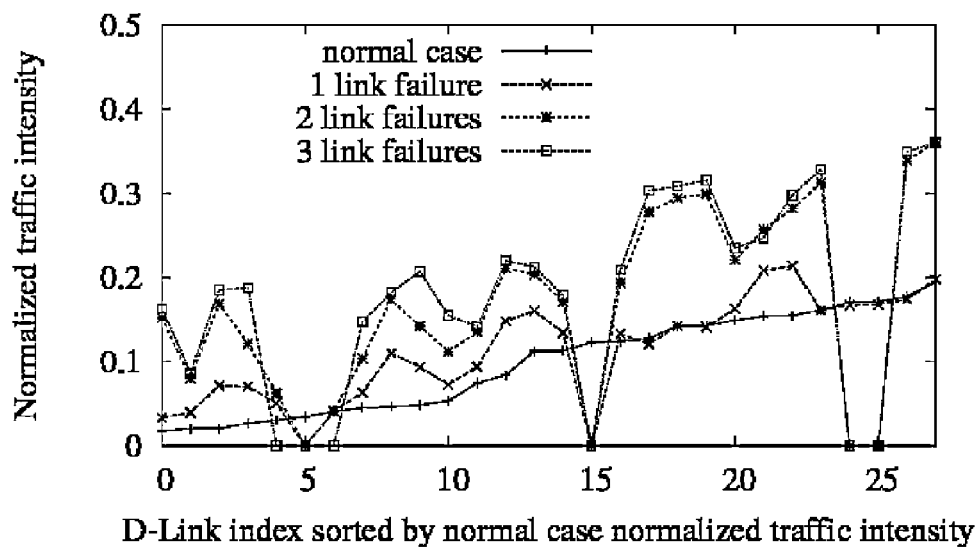
Figure 10C:
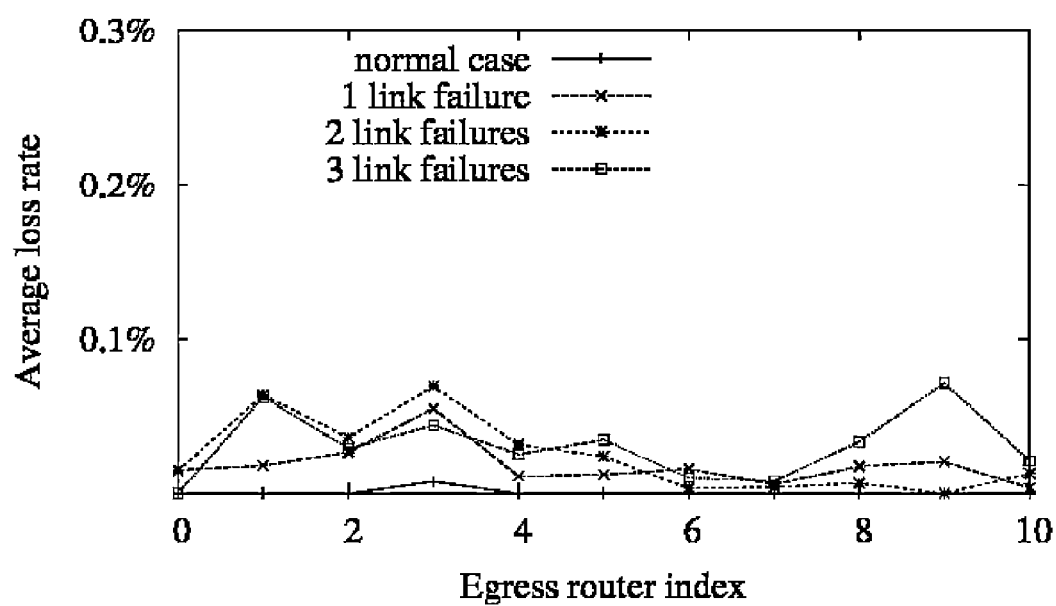
Figure 11:
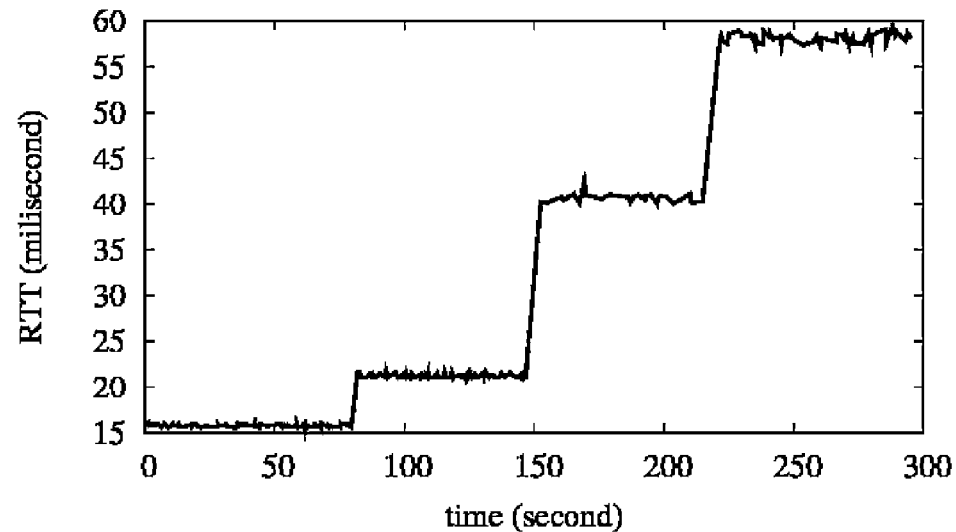
FIG. 11 plots the real-time RTT of a flow between Denver and Los Angeles during the Emulab experiment process.

As shown in FIG. 10, the R3 Linux implementation successfully reroutes traffic without overloading any link. From FIG. 10B, it is clear that despite three failed links, the bottleneck traffic intensity is always within 0.37. FIG. 11 further plots the real-time RTT of a flow between Denver and Los Angeles during the test process. The figure clearly depicts the three-step increases of RTT, due to the three link failures. Clearly, the R3 protection routing implementation achieves smooth and efficient routing protection.

Figure 12:
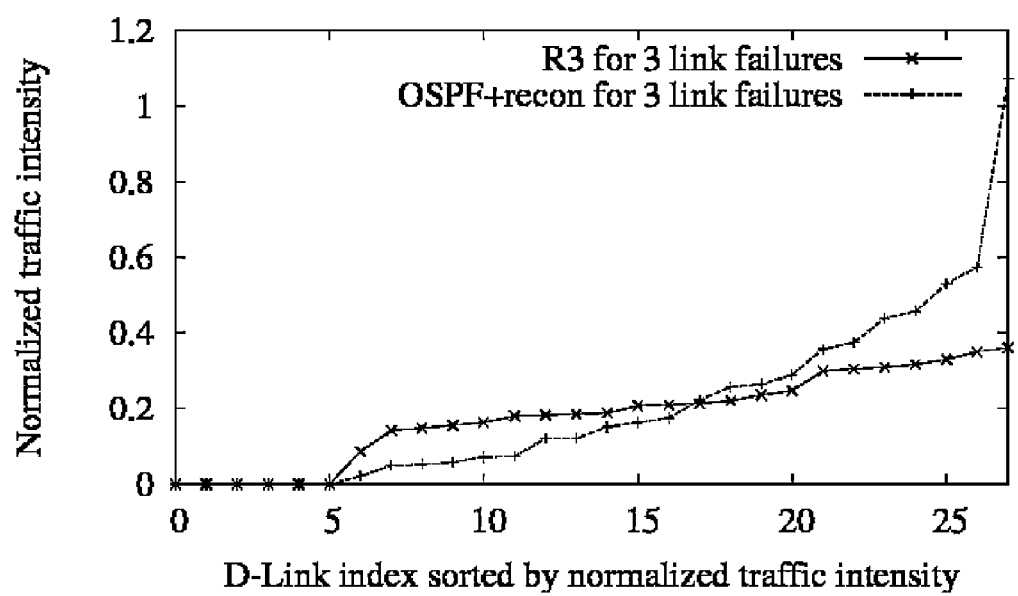
FIG. 12 shows the performance improvement of R3 over OSPF reconvergence protection using Emulab experiment.

To appreciate the effectiveness of R3, the same failure scenario is tested using OSPF reconvergence protection. FIG. 12 compares the traffic intensity by OSPF+recon vs MPLS-fr+R3. Using OSPF, the traffic intensity on the link between Washington and Atlanta (link index 28) reaches as high as 1.07 (instantaneous rate). Due to congestion, it can be seen from the trace that the throughput for the OD pair New York City to Indianapolis drop by up to 32.6% using OSPF+recon.

5. RELATED WORK

The work described herein builds on a body of existing work that can be classified into two categories: (i) routing under failures and (ii) routing under variable traffic.

Routing under failures: Many of recent studies focus on minimizing the duration of disruption due to failures (See, K. Kar, M. S. Kodialam, and T. V. Lakshman, "Routing restorable bandwidth guaranteed connections using maximum 2-route flows," *IEEE/ACM Transactions on Networking*, 11(5):772-781, 2003 (Kar et al. 2003), M. Kodialam and T. V. Lakshman, "Dynamic routing of locally restorable bandwidth guaranteed tunnels using aggregated link usage information," *Proc. IEEE INFOCOM*, April 2001 (Kodialam et al. 2001), M. Kodialam, T. V. Lakshman, and S. Sengupta, "A simple traffic independent scheme for enabling restoration oblivious routing of resilient connections," *Proc. IEEE INFOCOM*, April 2004 (Kodialam et al. 2004), M. S. Kodialam and T. V. Lakshman, "Dynamic routing of restorable bandwidth-guaranteed tunnels using aggregated network resource usage information," *IEEE/ACM Transactions on Networking*, 11(3):399-410, 2003 (Kodialam et al. 2003), A. Li, P. Francois, and X. Yang, "On improving the efficiency and manageability of NotVia," *Proc. CoNEXT*, December 2007 (Li et al. 2007), M. Shand and S. Bryant, "IP fast reroute framework," *IETF Internet-Draft*, draft-ietf-rtgwg-ipfrr-framework-06.txt, 2007 (Shand et al. 2007), Atlas et al. 2007, Lakshminarayanan et al. 2007, Motiwala et al. 2008). These techniques precompute protection and quickly reroute traffic upon detecting failures (and before routing convergence) (See V. Sharma, B. M. Crane, S. Makam, K. Owens, C. Huang, F. Hellstrand, J. Weil, L. Andersson, B. Jamoussi, B. Cain, S. Civanlar, and A. Chiu, "Framework for MPLS-Based Recovery," *RFC* 3469, February 2003 (Sharma et al. 2003)). However, they do not provide performance predictability or avoid congestion. As shown in Section 4, they may lead to serious congestion and thus violation of service level agreements. Meanwhile there are also significant studies on optimizing performance under failures. Fortz and Thorup have studied optimization of OSPF/IS-IS weights under failures (See B. Fortz and M. Thorup, "Robust optimization of OSPF/IS-IS weights. In *Proc. INOC*, October 2003 (Fortz et al. 2003)). However, it is a heuristics based approach and does not provide performance guarantee or avoidance of congestion. In MATE (See A. Elwalid, C. Jin, S. Low, and I. Widjaja, "MATE: MPLS adaptive traffic engineering," *Proc. IEEE INFOCOM*, April 2001 (Elwalid et al. 2001)) and TeXCP (See S. Kandula, D. Katabi, B. Davie, and A. Charny, "Walking the tightrope: Responsive yet stable traffic engineering," *Proc. ACM SIGCOMM*, August 2005 (Kandula et al. 2005)), the authors study how to react to instantaneous traffic load and redistribute traffic on alternate links or paths. Many previous studies achieve optimal performance by re-optimizing routing after each failure (e.g., MPLS routing (See Wang et al. 2006)). A major advantage of these approaches is that the new routing is computed specifically for the new topology. Thus, the new routing can efficiently utilize the remaining network resources and provide certain guarantees (e.g., how close the rerouting response compared with the optimal (See D. Applegate, L. Breslau, and E. Cohen, "Coping with network failures: Routing strategies for optimal demand oblivious restoration," *Proc. ACM SIGMETRICS*, June 2004 (Applegate et al. 2004))). A drawback of these approaches, however, is their slow response time. Re-optimization from scratch for the new topology can be computationally expensive. In addition, the new routing could be very different from the existing one and thus take substantial delay in installation and convergence. This can cause significant service disruption because of operation errors, forwarding loops and packet loss during long convergence process. As a result, network operators are highly reluctant to completely change their routing. Instead, they prefer simple routing reconfiguration. They completely re-optimize only periodically or after a major change, instead of after each topology failure. The only work that optimizes routing simultaneously for different topologies is Applegate et al. 2004, but it requires enumeration of all possible topologies after failures and faces scalability issues under multiple failures.

Routing under variable traffic demand: High variability in Internet traffic has motivated researchers to design robust traffic engineering that works well under variable traffic. One class of algorithms (See, S. Agarwal, A. Nucci, and S. Bhattacharyya, "Measuring the shared fate of IGP engineering and interdomain traffic," *Proc. ICNP*, November 2005 (Agarwal et al. 2005), C. Zhang, Z. Ge, J. Kurose, Y. Liu, and D. Towsley, "Optimal routing with multiple traffic matrices: Tradeoff between average case and worst case performance," *Proc. ICNP*, November 2005 (Zhang et al. 2005b), Elwalid et al. 2001, Kandula et al. 2005, Roughan et al. 2003] maintains a history of observed traffic demand matrices, and optimizes for the representative traffic demand matrices. Another class of algorithms is oblivious routing (See, L. G. Valiant, "A scheme for fast parallel communication," *SIAM Journal on Computing*, 11(7):350-361, 1982 (Valiant 1982), Applegate et al. 2004, Applegate et al. 2003, Kodialam et al. 2001), which optimizes the worst-case performance over all possible traffic demands. More recently, Wang et al. 2007 further combined oblivious routing with prediction-based optimization to provide good performance under typical demands while guaranteeing the worst-case performance. These works focus on traffic variability and do not consider topology variability.

6. CONCLUSIONS

As described herein, the present invention provides a method and system for R3, the first routing scheme that provides congestion-free guarantee under a large number of failure scenarios. R3 is also flexible and can handle traffic variations, realistic failure scenarios, prioritized traffic, and the tradeoff between performance and resilience. A full implementation of R3 is carried out on Linux using MPLS-fr. Real experiments and extensive simulations using realistic network topologies and traffic clearly demonstrate the feasibility and effectiveness of the methods of embodiments.

As described above and as will be appreciated by one skilled in the art, embodiments of the present invention may be configured as a system, method or apparatus. Accordingly, embodiments of the present invention may be comprised of various means including entirely of hardware, entirely of software, or any combination of software and hardware. Furthermore, embodiments of the present invention may take the form of a computer program product on a computer-readable storage medium having computer-readable program instructions (e.g., computer software) embodied in the storage medium. Any suitable computer-readable storage medium may be utilized including hard disks, CD-ROMs, optical storage devices, or magnetic storage devices.

Embodiments of the present invention have been described above with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for rerouting traffic in an Internet Protocol (IP) network, the method comprising:

creating a virtual demand for links in said IP network;

precomputing a routing for an actual demand plus said virtual demand for said links in said IP network on an original network topology prior to detecting any failures in said links in said IP network in order to minimize a maximum link utilization over said IP network after an occurrence of link failures;

detecting one or more links in said IP network that have failed; and converting, by a processor, said precomputed routing into a routing that does not traverse said detected one or more failed links in said IP network in response to detecting said one or more failed links in said IP network, wherein said routing that does not traverse said detected one or more failed links is guaranteed to be congestion free provided that said maximum link utilization is less than one.

2. The method as recited in claim 1 further comprising:
rerouting traffic on said detected one or more failed links to said routing that does not traverse said detected one or more failed links in said IP network.

3. The method as recited in claim 2, wherein said rerouted traffic is congestion free.

4. The method as recited in claim 1 further comprising:
performing a convex combination of said virtual demand for said links in said IP network.

5. The method as recited in claim 4 further comprising:
representing said convex combination of said virtual demand for said links in said IP network as a set of linear constraints.

6. The method as recited in claim 5 further comprising:
implementing programming duality on said set of linear constraints.

7. The method as recited in claim 1, wherein said precomputing, said detecting one or more links in said IP network that have failed and said converting are performed in connection with handling traffic variations and topology variations.

8. The method as recited in claim 7, wherein said precomputing performed in connection with said handling of traffic variations and topology variations comprises precomputing said routing for a convex combination of multiple actual demands plus said virtual demand for said links in said IP network.

9. The method as recited in claim 1, wherein said precomputing, said detecting one or more links in said IP network that have failed and said converting are performed in connection with handling realistic failure scenarios.

10. The method as recited in claim 9, wherein said handling of realistic failure scenarios comprises adding constraints that encode knowledge that a single composite failure or a maintenance event simultaneously disables multiple links.

11. The method as recited in claim 1, wherein said precomputing, said detecting one or more links in said IP network that have failed and said converting are performed in connection with handling prioritized traffic with different protection levels.

12. The method as recited in claim 11, wherein said precomputing performed in connection with said handling of prioritized traffic with different protection levels comprises precomputing said routing such that, as long as a number of link failures is less than or equal to a specified protection level associated with a traffic priority, all traffic with equal or higher priorities can be routed by said routing without having congestion.

13. The method as recited in claim 1, wherein said precomputing, said detecting one or more links in said IP network that have failed and said converting are performed in connection with achieving tradeoff between performance under normal and failure conditions.

14. The method as recited in claim 13, wherein said achieving tradeoff between performance under normal and failure conditions comprises bounding a ratio between a performance under a derived protection routing and a performance under an optimal routing under failures.

15. A non-transitory computer readable storage medium storing a computer program product for rerouting traffic in an Internet Protocol (IP) network, the computer program product comprising the programming instructions for:
creating a virtual demand for links in said IP network;
precomputing a routing for an actual demand plus said virtual demand for said links in said IP network on an original network topology prior to detecting any failures in said links in said IP network in order to minimize a maximum link utilization over said IP network after an occurrence of link failures;
detecting one or more links in said IP network that have failed; and
converting said precomputed routing into a routing that does not traverse said detected one or more failed links in said IP network in response to detecting said one or more failed links in said IP network, wherein said routing that does not traverse said detected one or more failed links is guaranteed to be congestion free provided that said maximum link utilization is less than one.

16. The computer program product as recited in claim 15 further comprising the programming instructions for:
rerouting traffic on said detected one or more failed links to said routing that does not traverse said detected one or more failed links in said IP network.

17. The computer program product as recited in claim 16, wherein said rerouted traffic is congestion free.

18. The computer program product as recited in claim 15 further comprising the programming instructions for:
performing a convex combination of said virtual demand for said links in said IP network.

19. The computer program product as recited in claim 18 further comprising the programming instructions for:
representing said convex combination of said virtual demand for said links in said IP network as a set of linear constraints.

20. The computer program product as recited in claim 19 further comprising the programming instructions for:
implementing programming duality on said set of linear constraints.

21. The computer program product as recited in claim 15, wherein said precomputing, said detecting one or more links in said IP network that have failed and said converting are performed in connection with handling traffic variations and topology variations.

22. The computer program product as recited in claim 21, wherein said precomputing performed in connection with said handling of traffic variations and topology variations comprises precomputing said routing for a convex combination of multiple actual demands plus said virtual demand for said links in said IP network.

23. The computer program product as recited in claim 15, wherein said precomputing, said detecting one or more links in said IP network that have failed and said converting are performed in connection with handling realistic failure scenarios.

24. The computer program product as recited in claim 23, wherein said handling of realistic failure scenarios comprises adding constraints that encode knowledge that a single composite failure or a maintenance event simultaneously disables multiple links.

25. The computer program product as recited in claim 15, wherein said precomputing, said detecting one or more links in said IP network that have failed and said converting are performed in connection with handling prioritized traffic with different protection levels.

26. The computer program product as recited in claim 25, wherein said precomputing performed in connection with said handling of prioritized traffic with different protection levels comprises precomputing said routing such that, as long as a number of link failures is less than or equal to a specified protection level associated with a traffic priority, all traffic with equal or higher priorities can be routed by said routing without having congestion.

27. The computer program product as recited in claim 15, wherein said precomputing, said detecting one or more links in said IP network that have failed and said converting are performed in connection with achieving tradeoff between performance under normal and failure conditions.

28. The computer program product as recited in claim 27, wherein said achieving tradeoff between performance under normal and failure conditions comprises bounding a ratio between a performance under a derived protection routing and a performance under an optimal routing under failures.

29. A system, comprising:
a memory unit for storing a computer program for rerouting traffic in an Internet Protocol (IP) network; and
a processor coupled to said memory unit, wherein said processor, responsive to said computer program, comprises:
circuitry for creating a virtual demand for links in said IP network;
circuitry for precomputing a routing for an actual demand plus said virtual demand for said links in said IP network on an original network topology prior to detecting any failures in said links in said IP network in order to minimize a maximum link utilization over said IP network after an occurrence of link failures;
circuitry for detecting one or more links in said IP network that have failed; and
circuitry for converting said precomputed routing into a routing that does not traverse said detected one or more failed links in said IP network in response to detecting said one or more failed links in said IP network, wherein said routing that does not traverse said detected one or more failed links is guaranteed to be congestion free provided that said maximum link utilization is less than one.

30. The system as recited in claim 29, wherein said processor further comprises:
circuitry for rerouting traffic on said detected one or more failed links to said routing that does not traverse said detected one or more failed links in said IP network.

31. The system as recited in claim 30, wherein said rerouted traffic is congestion free.

32. The system as recited in claim 29, wherein said processor further comprises:
circuitry for performing a convex combination of said virtual demand for said links in said IP network.

33. The system as recited in claim 32, wherein said processor further comprises:
circuitry for representing said convex combination of said virtual demand for said links in said IP network as a set of linear constraints.

34. The system as recited in claim 33, wherein said processor further comprises:
circuitry for implementing programming duality on said set of linear constraints.

35. The system as recited in claim 29, wherein said precomputing, said detecting one or more links in said IP network that have failed and said converting are performed in connection with handling traffic variations and topology variations.

36. The system as recited in claim 35, wherein said precomputing performed in connection with said handling of traffic variations and topology variations comprises precomputing said routing for a convex combination of multiple actual demands plus said virtual demand for said links in said IP network.

37. The system as recited in claim 29, wherein said precomputing, said detecting one or more links in said IP network that have failed and said converting are performed in connection with handling realistic failure scenarios.

38. The system as recited in claim 37, wherein said handling of realistic failure scenarios comprises adding constraints that encode knowledge that a single composite failure or a maintenance event simultaneously disables multiple links.

39. The system as recited in claim 29, wherein said precomputing, said detecting one or more links in said IP network that have failed and said converting are performed in connection with handling prioritized traffic with different protection levels.

40. The system as recited in claim 39, wherein said precomputing performed in connection with said handling of prioritized traffic with different protection levels comprises precomputing said routing such that, as long as a number of link failures is less than or equal to a specified protection level associated with a traffic priority, all traffic with equal or higher priorities can be routed by said routing without having congestion.

41. The system as recited in claim 29, wherein said precomputing, said detecting one or more links in said IP network that have failed and said converting are performed in connection with achieving tradeoff between performance under normal and failure conditions.

42. The system as recited in claim 41, wherein said achieving tradeoff between performance under normal and failure conditions comprises bounding a ratio between a performance under a derived protection routing and a performance under an optimal routing under failures.

* * * * *